(12) United States Patent
Pagano

(10) Patent No.: US 8,129,953 B2
(45) Date of Patent: Mar. 6, 2012

(54) POWER MANAGEMENT UNIT FOR A WIRELESS DEVICE

(75) Inventor: Rosario Pagano, Fort Collins, CO (US)

(73) Assignee: Broadcom Corporation, Irvine, CA (US)

( * ) Notice: Subject to any disclaimer, the term of this patent is extended or adjusted under 35 U.S.C. 154(b) by 395 days.

(21) Appl. No.: 12/461,197

(22) Filed: Aug. 4, 2009

(65) Prior Publication Data

US 2011/0031934 A1    Feb. 10, 2011

(51) Int. Cl.
*H01M 10/44*    (2006.01)
*H01M 10/46*    (2006.01)

(52) U.S. Cl. ........................................ 320/141

(58) Field of Classification Search ................ 320/107, 320/114, 115, 128, 135, 137, 139, 141
See application file for complete search history.

(56) References Cited

U.S. PATENT DOCUMENTS

| | | | |
|---|---|---|---|
| 5,557,190 A * | 9/1996 | Brotto | 320/161 |
| 6,043,631 A * | 3/2000 | Tsenter | 320/148 |
| 2005/0170245 A1 * | 8/2005 | Vartak et al. | 429/209 |
| 2010/0102628 A1 * | 4/2010 | Soma et al. | 307/10.1 |

* cited by examiner

*Primary Examiner* — Edward Tso
(74) *Attorney, Agent, or Firm* — Sterne, Kessler, Goldstein & Fox P.L.L.C.

(57) ABSTRACT

A method and apparatus is disclosed to regulate an input voltage to provide a regulated output power. The regulated output power may include a smooth direct current (DC) component and an undesired alternating current (AC) component, the smooth DC component being an average of the regulated output power. A buck regulator module of the present invention regulates the smooth DC component to approximate a reference voltage. The buck regulator module additionally replicates the undesired AC component embedded within the regulated output power. A replicated undesired AC component is combined with the regulated output power to reduce the undesired AC component embedded within the output power.

24 Claims, 13 Drawing Sheets

POWER MANAGEMENT UNIT FOR A WIRELESS DEVICE

FIELD OF THE INVENTION

The present invention relates generally to a cellular phone and specifically to a power management unit for the cellular phone.

BACKGROUND

Cellular phones have evolved from large devices that were only capable of analog voice communications to comparatively smaller devices that are capable of digital voice communications and digital data communications, such as Short Message Service (SMS) for text messaging, email, packet switching for access to the Internet, gaming, Bluetooth, and Multimedia Messaging Service (MMS) to provide some examples. In addition to these capabilities, the cellular phones of today have additional non-communication related capabilities, such as a camera with video recording, an MPEG-1 Audio Layer 3 (MP3) player, and software applications such as a calendar and a phone book, to provide some examples. Even in light of these capabilities, manufacturers of cellular phones are placing even more capabilities into cellular phones and making these more power cellular phones smaller.

At the heart of each cellular phone lies a power management unit (PMU). The PMU is responsible for monitoring power connections and battery charges, charging batteries when necessary, and controlling power to other integrated circuits, as well other power functions of the cellular phone. The PMU may include one or more voltage regulators, such as switching regulators or linear regulators to provide some examples, to control power to other integrated circuits of the cellular phone. One type of voltage regulator commonly used is a buck switching regulator. The most popular buck switching regulators for cellular phones, and wireless devices in general, are current programmed mode converter and the hysteresis control converter. The current programmed mode converter exhibits good load regulation and audio-susceptibility, however, its control bandwidth is not wide and its load-step performances are poorer than those of hysteresis control converters. On the other hand, hysteresis control converters have faster load-step response but poorer load regulation when compared to current programmed mode converter.

Thus, there is a need for a switching regulator that combines the advantages of the current programmed mode converter and the hysteresis control converter that overcomes the shortcomings described above. Further aspects and advantages of the present invention will become apparent from the detailed description that follows.

BRIEF DESCRIPTION OF THE DRAWINGS/FIGURES

The present invention is described with reference to the accompanying drawings. In the drawings, like reference numbers indicate identical or functionally similar elements. Additionally, the left most digit(s) of a reference number identifies the drawing in which the reference number first appears.

Figure 1:
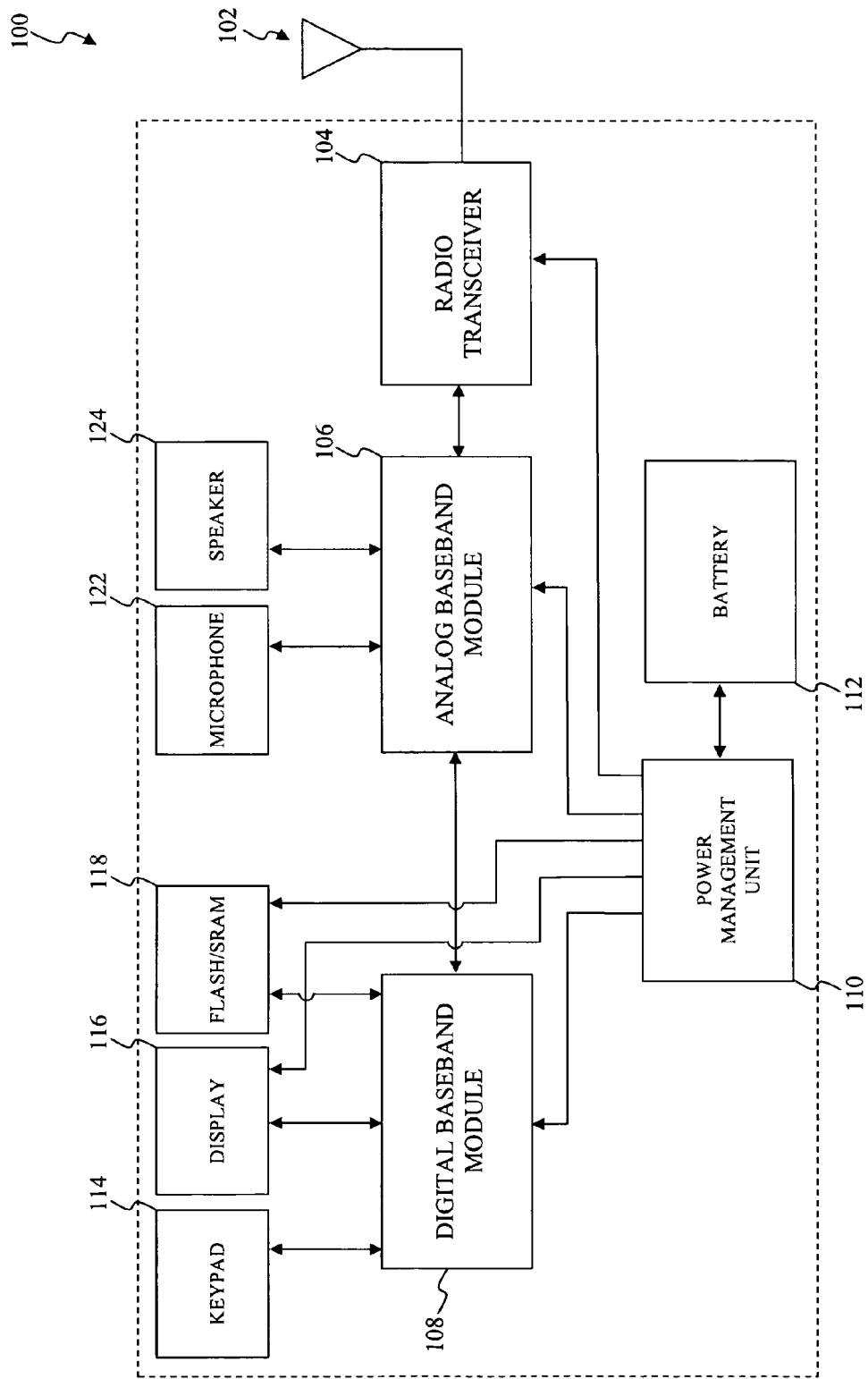
FIG. 1 illustrates a block diagram of a cellular phone according to an exemplary embodiment of the present invention.

The present invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

The following Detailed Description refers to accompanying drawings to illustrate exemplary embodiments consistent with the invention. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment.

Further, when a particular feature, structure, or characteristic is described in connection with an exemplary embodiment, it is within the knowledge of those skilled in the relevant art(s) to effect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the present invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

FIG. 1 illustrates a block diagram of a cellular phone according to an exemplary embodiment of the present invention. A cellular phone 100 represents a communications device used for voice or data communications from a near-end user to a far-end user over a cellular network. The cellular phone 100 may communicate with one or more fixed location transceivers, referred to as cell cites, within the cellular network. The cell cites are connected to a cellular telephone exchange that connects to a public telephone network or to another cellular telephone exchange within the cellular network allowing the near-end user to communicate, via the cellular phone 100, with the far-end user.

The cellular phone 100 includes an antenna 102, a radio transceiver 104, an analog baseband module 106, a digital baseband module 108, a power management unit (PMU) 110, and a battery 112. The antenna 102 captures a received voice or data communication from the one or more fixed location transceivers and/or provides a transmitted voice or data communication from the radio transceiver 104 to the one or more fixed location transceivers.

The radio transceiver 104 may include one or more amplifiers, such as one or more low noise amplifiers (LNAs) and/or one or more low noise block converters (LNBs) to provide some examples, to amplify the received voice or data communication after it has been captured by the antenna 102 and/or to amplify the transmitted voice or data communication prior to being provided to the one or more fixed location transceivers. The radio transceiver 104 may additionally include one or more filters to filter the received voice or data communication and/or the transmitted voice or data communication, respectively. The radio transceiver 104 may further include one or more mixers to downconvert the received voice or data communication after it has been captured by the antenna 102 and/or to upconvert the transmitted voice or data communication prior to being provided to the one or more fixed location transceivers. The radio transceiver 104 may yet further include a diplexer or switch to separate the received voice or data communication captured from the one or more fixed location transceivers and the transmitted voice or data communication to be provided to the one or more fixed location transceivers.

The analog baseband module 106 performs typical analog signal processing upon the received voice or data communication and/or the transmitted voice or data communication. For example, the analog baseband module 106 may include a channel encoder to encode the transmitted voice or data communication and/or a channel decoder to decode the received voice or data communication according to one or more linear block codes and/or one or more convolutional codes. The analog baseband module 106 may additionally include one or more multiplexers to multiplex a voice communication received from a microphone 122 with a data communication received from the digital baseband processing module 108 and/or one or more demultiplexers to demultiplex the received voice or data communication to provide a voice communication to a speaker 124 and a data communication to the digital baseband processing module 108. The analog baseband module 106 may further include one or more speech encoders to encode the voice communication received from the microphone 122 and/or one or more speech decoders to decode the voice communication provided to the speaker 124. The analog baseband module 106 may yet further include one or more analog to digital converters to convert the data communication to be provided to the digital baseband processing module 108 to a digital representation and/or one or more digital to analog converters to convert the data communication from the digital baseband processing module 108 to an analog representation.

The digital baseband processing module 108 performs typical digital signal processing upon the data communication provided by the analog baseband module 106 and/or the data communication to be provided to the analog baseband module 106. The digital baseband processing module 108 may include one or more processors to load one or more software applications from the flash/SRAM 118. The one or more software applications may operate upon the data communication provided by the analog baseband module 106 to provide a graphical output to a display 116. A keypad 114 may provide a numerical input, such as a telephone number of the far-end user, a text message for a Short Message Service (SMS) application, an electronic mail message destined for the near-end user, or any other suitable application to be performed by the near-end user to provide some examples, to the digital baseband processing module 108. The one or more software applications may operate on this numerical input to provide the data communication for the analog baseband module 106. The one or more software applications, such as electronic games to provide an example, may operate upon the numerical input from the keypad 114 to provide the graphical output to the display 116 and/or voice data for the analog baseband module 106 for the speaker 124. The digital baseband processing module 108 may further store the numerical input from the keypad 114, the graphical output to the display 116, and/or the data communication provided by the analog baseband module 106 into the flash/SRAM 118.

The PMU 110 is responsible for monitoring power connections and battery charges, charging batteries when necessary, and controlling power to other integrated circuits, as well other power functions of the cellular phone. For example, the PMU 110 converts a first voltage received from a battery 112, and/or any other suitable source, to one or more second voltages to be used by the cellular phone 100. The PMU may additionally include one or more battery chargers to charge the battery 112 from an external alternating current (AC) and/or direct current (DC) source. The PMU may further communicate a status of the battery 112 to the digital baseband processing module 108.

The battery 112 may include one or more nickel-cadmium (NiCd), one or more nickel metal hydride (NiMH), and/or one or more lithium-ion (Li-ion) cells. However, this example is not limiting, those skilled in the relevant art(s) may implement the battery 112 using other battery chemistries without departing from the scope and spirit of the present invention. The one or more cells of the battery 112 convert chemical energy into electrical energy via an electrochemical reaction.

One or more components of the cellular phone 100, such as, but not limited to, the radio transceiver 104, the analog baseband module 106, the digital baseband module 108, and/or the PMU 110 to provide some examples, may be implemented on a common chip or die. For example, the digital baseband module 108 and the PMU 110 may be implemented on a common chip or die. Alternatively, the one or more components of the cellular phone 100 may be each implemented on a single chip or die. For example, the radio transceiver 104, the analog baseband module 106, the digital baseband module 108, and/or the PMU 110 may each be implemented on a single chip or die.

Figure 2:
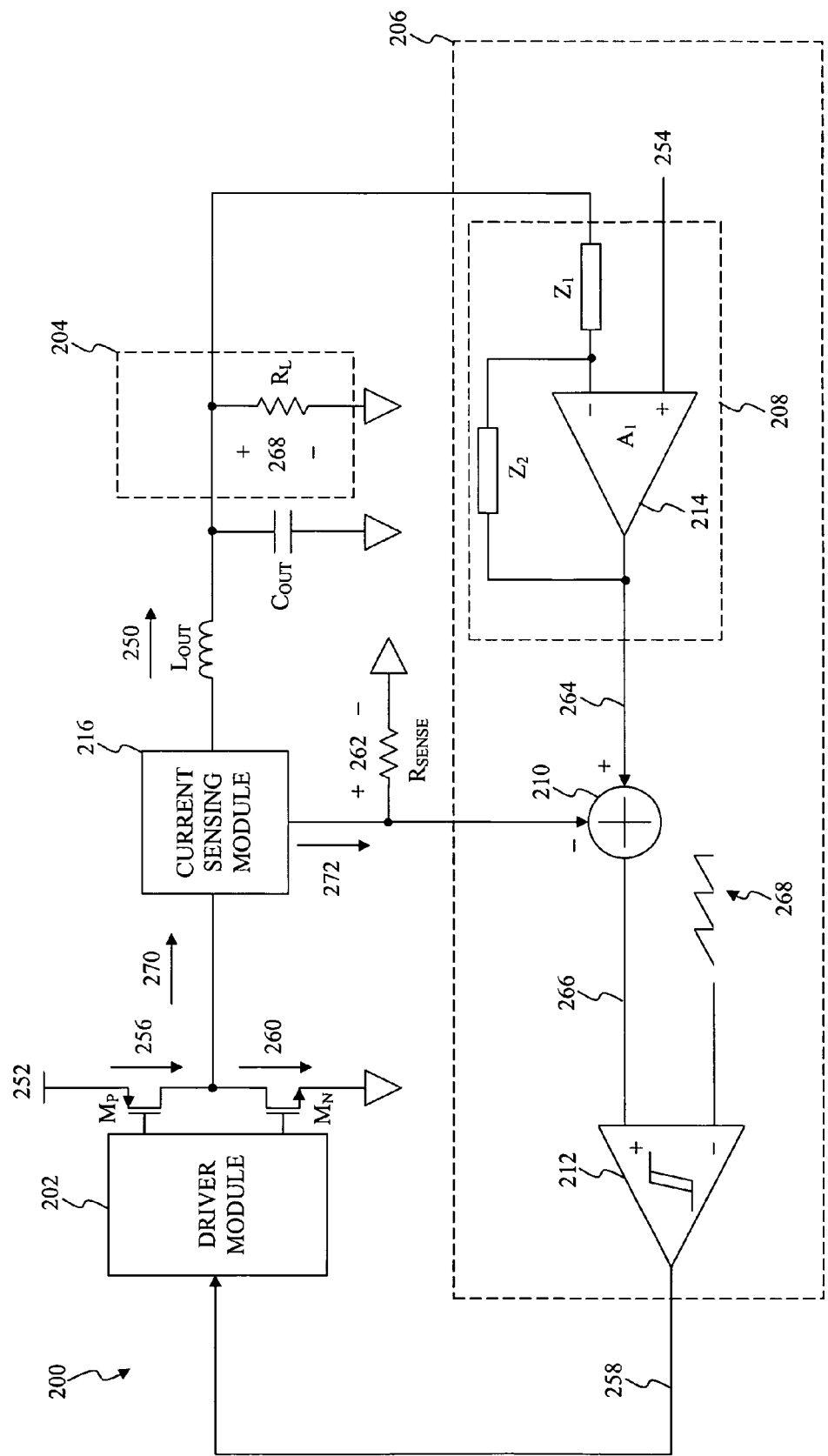
FIG. 2 illustrates a conventional current-programmed-control buck regulator module used in a conventional power management unit.

FIG. 2 illustrates a conventional current-programmed-control buck regulator module used in a conventional power management unit. The PMU 110 may include one or more conventional buck regulator modules 200 to provide one or more output powers for operation of the cellular phone 100. The conventional buck regulator module 200 provides an output power including an output current 250 and/or an output voltage 268 based upon an input voltage 252 from the battery 112 or any other suitable source. The conventional buck regulator module 200 regulates the input voltage 252 such that a smooth direct current (DC) component of the output current 250 and/or the output voltage 268 closely approximates a reference voltage 254. However, as will be discussed below, regulation of the input voltage 252 by charging and/or discharging of an output capacitor $C_{OUT}$ may introduce an undesired alternating current (AC) power component, referred to as a ripple, into the output current 250 and/or the output voltage 268.

The conventional buck regulator module 200 includes a driver module 202, a load 204, a pulse width modulator (PWM) 206, and a current sensing module 216. The driver module 202 causes a charging transistor $M_P$ to source a charging current 256 to the output capacitor $C_{OUT}$ via an output inductor $L_{OUT}$ based upon a PWM control signal 258. The charging current 256 causes a power stored by the output capacitor $C_{OUT}$, namely the output current 250 and/or the output voltage 268, to increase. Alternatively, the driver module 202 causes a discharging transistor $M_N$ to sink a discharging current 260 from the output capacitor $C_{OUT}$ via the output inductor $L_{OUT}$, based upon the PWM control signal 258. The discharging current 260 causes the power stored by the output capacitor $C_{OUT}$ to decrease.

The driver module 202 may cause the charging transistor $M_P$ to source the charging current 256 when the PWM control signal 258 is at a first voltage level, such as a logical zero to provide an example, and the discharging transistor $M_N$ to sink the discharging current 260 when the PWM control signal 258 is at a second voltage level, such as a logical one to provide an example. As a result of the charging of the output capacitor $C_{OUT}$ and the discharging of the output capacitor $C_{OUT}$ by the charging current 256 and the discharging current 260, respectively, the undesired AC component may be introduced into the output current 250 and/or the output voltage 268. The undesired AC component may cause the output current 250 and/or the output voltage 268 to deviate from the smooth DC power component.

The charging current 256 and the discharging current 260 may be combined to form a charging current 270. The current sensing module 216 may provide the output current 250 and/or a scaled charging current 272 based upon a charging current 270, the scaled charging current 272 being proportional to the output current 250. The current sensing module 216 may be implemented using any well known current sensor or any other suitable device that may be used to scale the charging current 270 to provide the scaled charging current 272 that will be apparent to those skilled in the relevant art(s).

The conventional buck regulator module 200 provides the output current 250 to the load 204. The load 204 includes a resistor $R_L$ to approximate the output power necessary for operation of one or more of the radio transceiver 104, the analog baseband module 106, the digital baseband module 108, the display 116, the flash/SRAM 118, and any other component of the cellular phone 100 that will be apparent to those skilled in the relevant art(s). However, this example, is not limiting, those skilled in the relevant art(s) will recognize the load 204 may include any suitable combination of passive elements such as resistors, inductors, and/or capacitors.

The PWM 206 provides the PWM control signal 258 by comparing the output voltage 268 to the reference voltage 254 and/or a scaled voltage 262, the scaled voltage 262 representing a product of the scaled charging current 272 and a resistor $R_{SENSE}$, namely a scaled version of the output current 250 that has been reduced or scaled by a resistor $R_{SENSE}$. The PWM 206 includes an amplifier module 208, a combination module 210, and a comparator 212. The amplifier module 208 includes an operational amplifier 214 coupled to a first impedance $Z_1$, the first impedance $Z_1$ having a first termination connected to an inverting input of the operational amplifier 214 and a second termination to receive the output voltage 268. The amplifier module 208 additionally includes a second impedance $Z_2$ coupled between the inverting input and an output of the operational amplifier 214. The operational amplifier 214 further includes a non-inverting input to receive the reference voltage 254. Assuming that the second impedance $Z_2$ is infinite at substantially zero Hertz, referred to as DC, the amplifier module 208 provides a first error voltage 264 that is proportional to a difference between the output voltage 268 and the reference voltage 254.

The combination module 210 combines the scaled voltage 262 and the first error voltage 264 to provide a second error voltage 266. The combination module 210 subtracts the first error voltage 264 from the scaled voltage 262 to provide the second error voltage 266.

The comparator 212 compares the second error voltage 266 to a reference pulse 268, such as a saw tooth pulse to provide an example, to provide the PWM control signal 258. The comparator 212 provides the PWM control signal 258 having the first voltage level when the second error voltage 266 is less than the reference pulse 268. Alternatively, the comparator 212 provides the PWM control signal 258 having the second voltage level when the second error voltage 266 is greater than or equal to the reference pulse 268.

Figure 3:
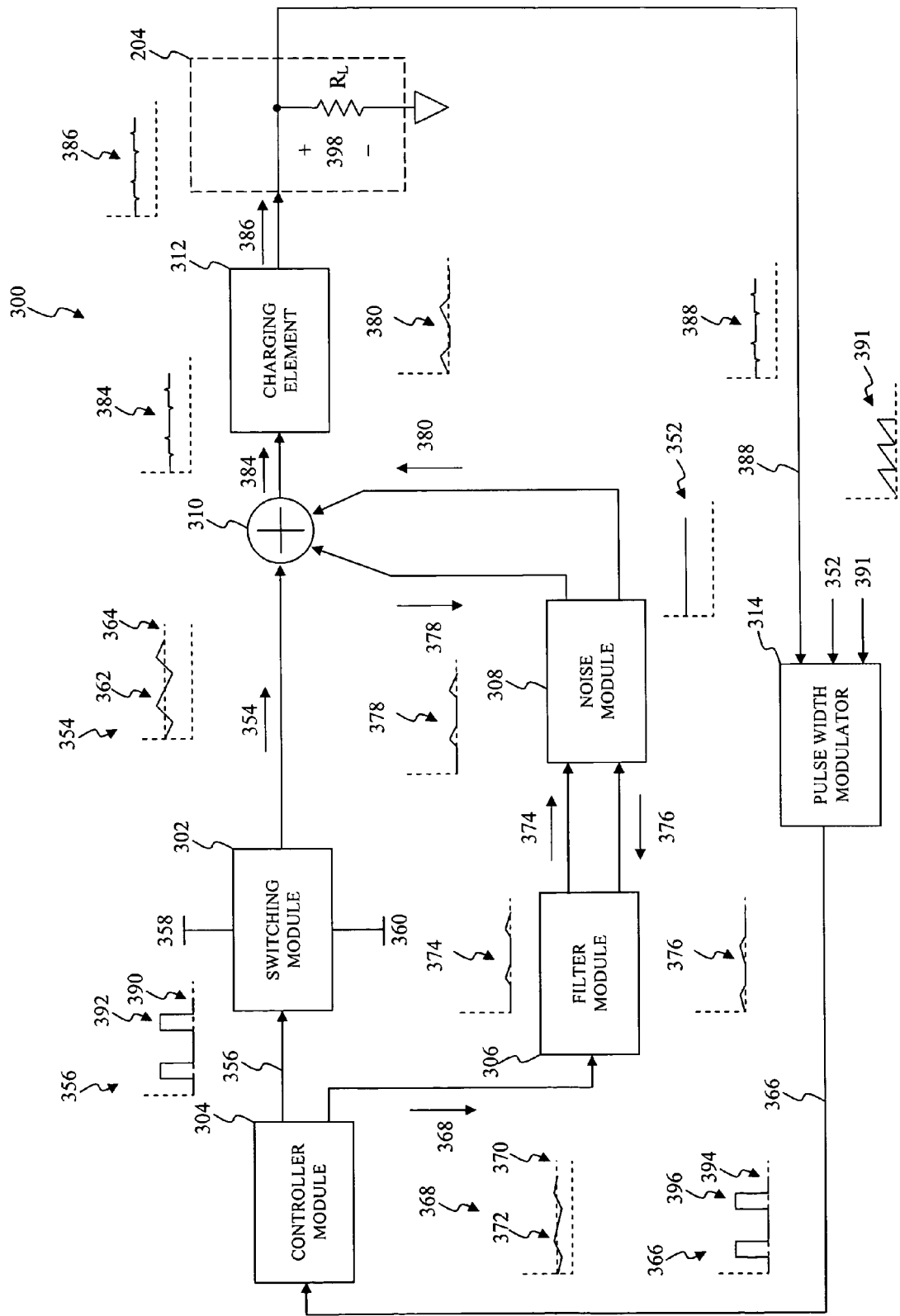
FIG. 3 illustrates a functional block diagram of a voltage-mode buck regulator module used in a power management unit according to an exemplary embodiment of the present invention.

FIG. 3 illustrates a functional block diagram of a voltage-mode buck regulator module used in a power management unit according to an exemplary embodiment of the present invention. The PMU 110 may include one or more buck regulator modules 300 to provide one or more output powers for operation of the cellular phone 100. Each buck regulator module 300 provides an output power, including an output current 386 and/or an output voltage 398 based upon an input power from the battery 112 or any other suitable source. The buck regulator module 300 regulates the input power such that a smooth direct current (DC) power component of the output power closely approximates a reference power. Like the conventional buck regulator module 200 as discussed above, the output power provided by the buck regulator module 300 additionally includes an undesired alternating current (AC) power component. The undesired AC power component embedded within the output power of the buck regulator module 300, however, is substantially less than the undesired AC power component embedded within the output power provided by the conventional buck regulator module 200.

The buck regulator module 300 includes the load 204, a switching module 302, a controller module 304, a filter module 306, a noise module 308, a combination module 310, a charging element 312, and a pulse width modulator (PWM) 314. The switching module 302 sources and/or sinks a charging current 354 based upon a charging control signal 356. More specifically, the switching module 302 continuously switches between a first input voltage 358, such as the input power from the battery 112 to provide an example, and a second input voltage 360, such as a ground potential to provide an example, in response to the charging control signal 356. A rate at which the switching module 302 switches between the first input voltage 358 and the second input voltage 360 is commonly referred to as a switching frequency. The switching module 302 may source the charging current 354 based upon the first input voltage 358 when the charging control signal 356 is at a first voltage level 390, such as a logic zero to provide an example. Alternatively, the switching module 302 may sink the charging current 354 to the second input voltage 360 when the charging control signal 356 is at a second voltage level 392, such as a logic one to provide an example. The continuous switching between the first input voltage 358 and the second input voltage 360 in this manner, as well as a charging and/or discharging time constant of the charging element 312, causes an undesired AC component 362 to be embedded within a smooth DC power 364 of the charging current 354, the smooth DC power 364 representing an average of the charging current 354.

The controller module 304 provides the charging control signal 356 based upon a PWM control signal 366. The controller module 304 may provide the charging control signal 356 at the first voltage level 390 when the PWM control signal 366 is at a first voltage level 394, such as a logic zero to provide an example. The controller module 304 may additionally provide the charging control signal 356 at the second voltage level 392 when the PWM control signal 366 is at a second voltage level 396, such as a logic one to provide an example. The first voltage level 390 and the second voltage level 392 may be similar or dissimilar in magnitude to the first voltage level 394 and the second voltage level 396, respectively. Alternatively, the controller module 304 may provide the charging control signal 356 at the first voltage level 390 when the PWM control signal 366 is at the second voltage level 396 and/or the charging control signal 356 at the second voltage level 392 when the PWM control signal 366 is at the first voltage level 394.

The controller module 304 may additionally replicate the charging current 354 to provide a scaled charging current 368, the scaled charging current 368 being proportional to the charging current 354 by a first scaling factor. The controller module 304 may source the scaled charging current 368 to the filter module 306 when the switching module 302 sources the charging current 354. Alternatively, the controller module 304 may sink the scaled charging current 368 from the filter module 306 when the switching module 302 sinks the charging current 354. The scaled charging current 368 includes a smooth DC component 370 and an undesired AC component 372, the smooth DC component 370 and the undesired AC component 372 being proportional to the smooth DC power 364 and the undesired AC component 362, respectively. In an exemplary embodiment, the controller module 304 reduces the charging current 354 by the first scaling factor to provide the scaled charging current 368. In this exemplary embodiment, the scaled charging current 368 includes the smooth DC component 370 and the undesired AC component 372, each of which have been reduced or scaled from the smooth DC power 364 and the undesired AC component 362, respectively, by the first scaling factor. The controller module 304 may provide the scaled charging current 368 by observing or sensing the charging current 354. Alternatively, the controller module 304 may provide the scaled charging current 368 based upon the PWM control signal 366.

The filter module 306 sources a positive undesired AC current component 374 and sinks a positive undesired AC current component 376 based upon the scaled charging current 368, the positive undesired AC current component 374 and the positive undesired AC current component 376 representing an absolute value of the undesired AC component 372 when combined. More specifically, the filter module 306 filters or removes the smooth DC component 370 from the scaled charging current 368 leaving the undesired AC component 372. The filter module 306 separates the undesired AC component 372 into a differential signal. The differential signal includes the positive undesired AC current component 374 that represents components of the undesired AC component 372 that are greater than or equal to the smooth DC component 370 and the positive undesired AC current component 376 that represents the components of the undesired AC component 372 that are less than the smooth DC power component 370.

The noise module 308 scales the positive undesired AC current component 374 and the positive undesired AC current component 376 by a second scaling factor to source a positive replica undesired AC power 378 and to sink a positive replica undesired AC component 380. In an exemplary embodiment, the second scaling factor represents an inverse of the first scaling factor used by the controller module 304. The positive replica undesired AC power 378 represents a replica of the undesired AC component 362 that is greater than the smooth DC power 364. The positive replica undesired AC component 380 represents a replica of the undesired AC component 362 that is less than the smooth DC power 364.

The combination module 310 combines the charging current 354 with the positive replica undesired AC power 378 and the positive replica undesired AC component 380 to source and/or sink a noise reduced charging current 384. The combination module 310 may source the noise reduced charging current 384 to the charging element 312 when the switching module 302 sources the charging current 354, thereby increasing a charge stored by the charging element 312. Alternatively, the combination module 310 may sink the noise reduced charging current 384 from the charging element 312 when the switching module 302 sinks the charging current 354, thereby decreasing the charge stored by the charging element 312. The combining of the positive replica undesired AC power 378, the positive replica undesired AC component 380, and the charging current 354 substantially reduces the undesired AC component 362 that is greater than or equal to the smooth DC power 364 and the undesired AC component 362 that is less the smooth DC power 364, such that the undesired AC component 362, as a whole, is substantially reduced.

Ideally, combining the charging current 354, the positive replica undesired AC power 378, and the positive replica undesired AC component 380 in this manner would completely remove the undesired AC component 362 from the charging current 354. In practice, however, imperfections among the buck regulator module 300, such as a timing delays between the positive replica undesired AC power 378, the positive replica undesired AC component 380, and/or the charging current 354, and/or imperfections between the first scaling factor and the second scaling factor to provide some examples, cause at least some of the undesired AC component 362 to remain in the noise reduced charging current 384. This reduced undesired AC component 362 embedded within the noise reduced charging current 384, however, is substantially less than the undesired AC component embedded within the output power provided by the conventional buck regulator module 200, allowing for use of a smaller charging element 312, a smaller output inductor, to be discussed in FIG. 4 below, and/or a higher switching frequency in the buck regulator module 300 when compared to the conventional buck regulator module 200.

The charging element 312 sources and/or sinks the output current 386 based upon the noise reduced charging current 384. The charging element 312 stores a charge for use by the load 204. The charge stored by the charging element 312 may be increased when the switching module 302 sources the charging current 354. Alternatively, charge stored by the charging element 312 may be decreased when the switching module 302 sinks the charging current 354. In an exemplary embodiment, the charging element 312 includes a capacitor coupled to a ground. However, this example is not limiting, those skilled in the relevant art(s) will recognize that the charging element 312 may include any combination of passive elements such as resistors, capacitors, and/or inductors to provide some examples, and/or any combination of active elements such one or more transistors to provide an example, without departing from the spirit and scope of the present invention.

The PWM 314 provides the PWM control signal 366 by comparing a sensed output voltage 388 to the reference voltage 352 and a reference pulse 391, such as a saw tooth pulse to provide an example, the sensed output voltage 388 being proportional to the output voltage 398. The PWM 314 compares the reference voltage 352 to the sensed output voltage 388 to provide an error voltage, the error voltage representing a difference between the reference voltage 352 and the sensed output voltage 388. The PWM 314 provides the PWM control signal 366 by comparing the error voltage to the reference pulse 391. The PWM 314 provides the PWM control signal 366 having the first voltage level 394 when the error voltage is less than the reference pulse 391. Alternatively, the PWM 314 provides the PWM control signal 366 having the second voltage level 396 when the error voltage is greater than or equal to the reference pulse 391.

The output power required by the cellular phone 100 may fluctuate during operation of the cellular phone 100. As a result, the PWM 314 may cause the controller module 304 to augment the charging current 354 to accommodate for this fluctuation. For example, if the power required by the cellular phone 100 is decreased, the output current 386 required by the load 204 decreases causing the charge stored by the charging element 312 to increase. In this situation, the PWM 314 provides the PWM control signal 366 having more of the second voltage level 396 when compared to the first voltage level 394 such that the controller module 304 causes the switching module 302 to provide the charging current 354 from the second input voltage 360 for a greater duration in time when compared to the first input voltage 358 to decrease the charge stored by the charging element 312. As another example, if the power required by the cellular phone 100 is increased, the output current 386 required by the load 204 increases causing the charge stored by the charging element 312 to decrease. In this situation, the PWM 314 provides the PWM control signal 366 having more of the first voltage level 394 when compared to the second voltage level 396 such that the controller module 304 causes the switching module 302 to provide the charging current 354 from the first input voltage 358 for a greater duration in time when compared to the second input power 358 to increase the charge stored by the charging element 312.

Figure 4:
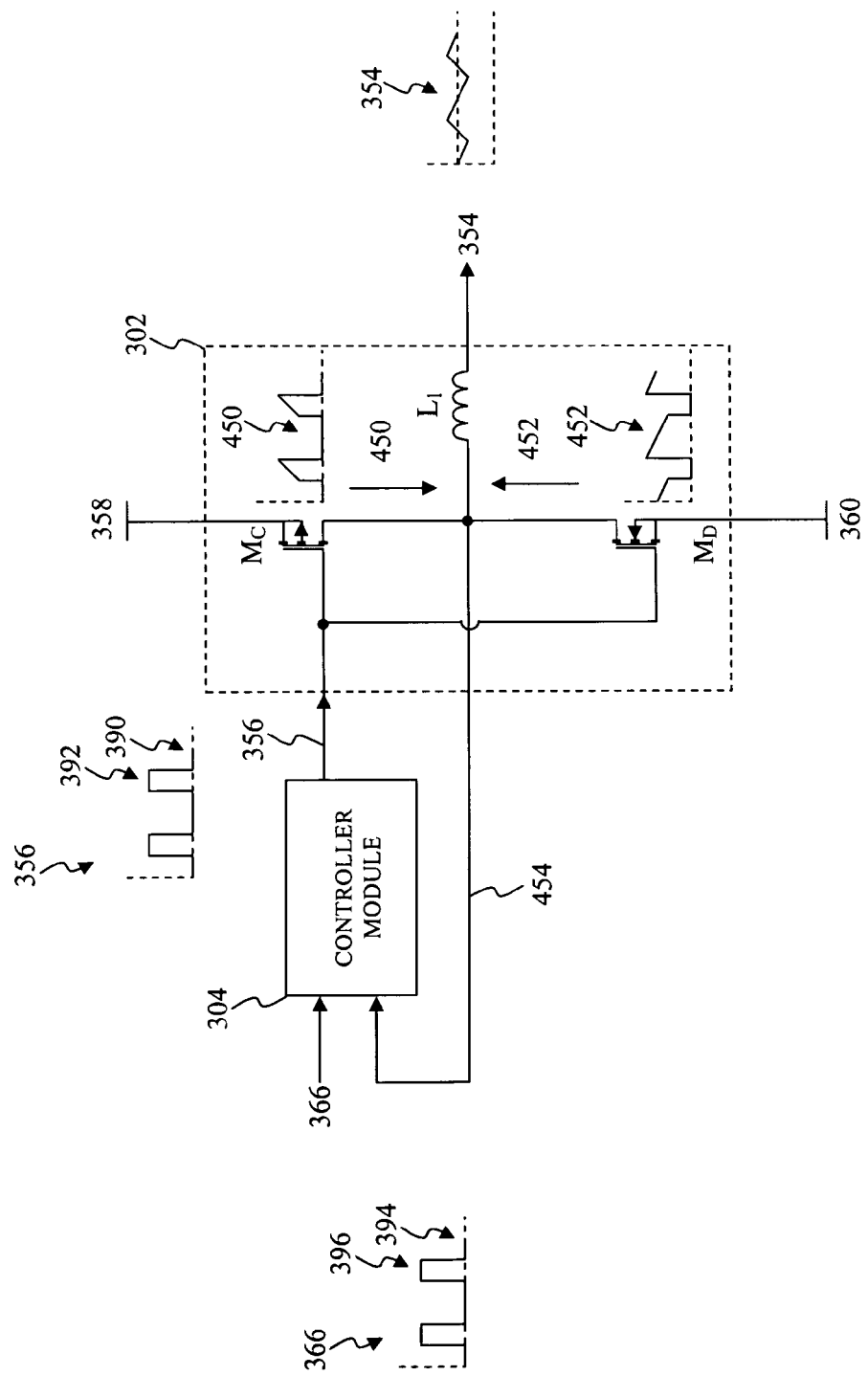
FIG. 4 illustrates a schematic block diagram of a switching module used in the voltage-mode buck regulator module according to an exemplary embodiment of the present invention.

FIG. 4 illustrates a schematic block diagram of a switching module used in the voltage-mode buck regulator module according to an exemplary embodiment of the present invention. The switching module 302 continuously switches between the first input voltage 358 and the second input voltage 360 to source or to sink the charging current 354 in response to the charging control signal 356.

The switching module 302 includes a charging transistor $M_C$, a discharging transistor $M_D$, and an optional inductor $L_1$. The charging transistor $M_C$ sources an element charging current 450 from the first voltage 358 in response to the charging control signal 356. In an exemplary embodiment, the charging transistor $M_C$ is implemented using a p-type metal oxide silicon (PMOS) transistor. In this exemplary embodiment, the charging transistor $M_C$ sources the element charging current 450 when the charging control signal 356 is at the first voltage level 390, the first voltage level 390 being less than a threshold voltage of the charging transistor $M_C$. In another exemplary embodiment, the element charging current 450 may be additionally provided to the controller module 304. In this exemplary embodiment, the controller module 304 scales the element charging current 450 by the first scaling factor to provide a scaled charging current, the scaled charging power being a first portion of the scaled charging current 368.

The discharging transistor $M_D$ sinks an element discharging current 452 from the charging current 354 in response to the charging control signal 356. In an exemplary embodiment, the discharging transistor $M_D$ is implemented using an n-type metal oxide silicon (NMOS) transistor. In this exemplary embodiment, the discharging transistor $M_D$ sinks the element discharging current 452 when the charging control signal 356 is at the second voltage level 392, the second voltage level being greater than or equal to a threshold voltage of the discharging transistor $M_D$. In another exemplary embodiment, the element discharging current 452 may be additionally provided to the controller module 304. In this exemplary embodiment, the controller module 304 scales the element discharging current 452 by the first scaling factor to provide a scaled discharging current, the scaled discharging current being a second portion of the scaled charging current 368.

The element charging current 450 and the element discharging current 452 may be combined to provide the charging current 354 via the optional inductor $L_1$. Alternatively, the element charging current 450 and the element discharging current 452 may be directly combined to provide the charging current 354.

Figure 5:
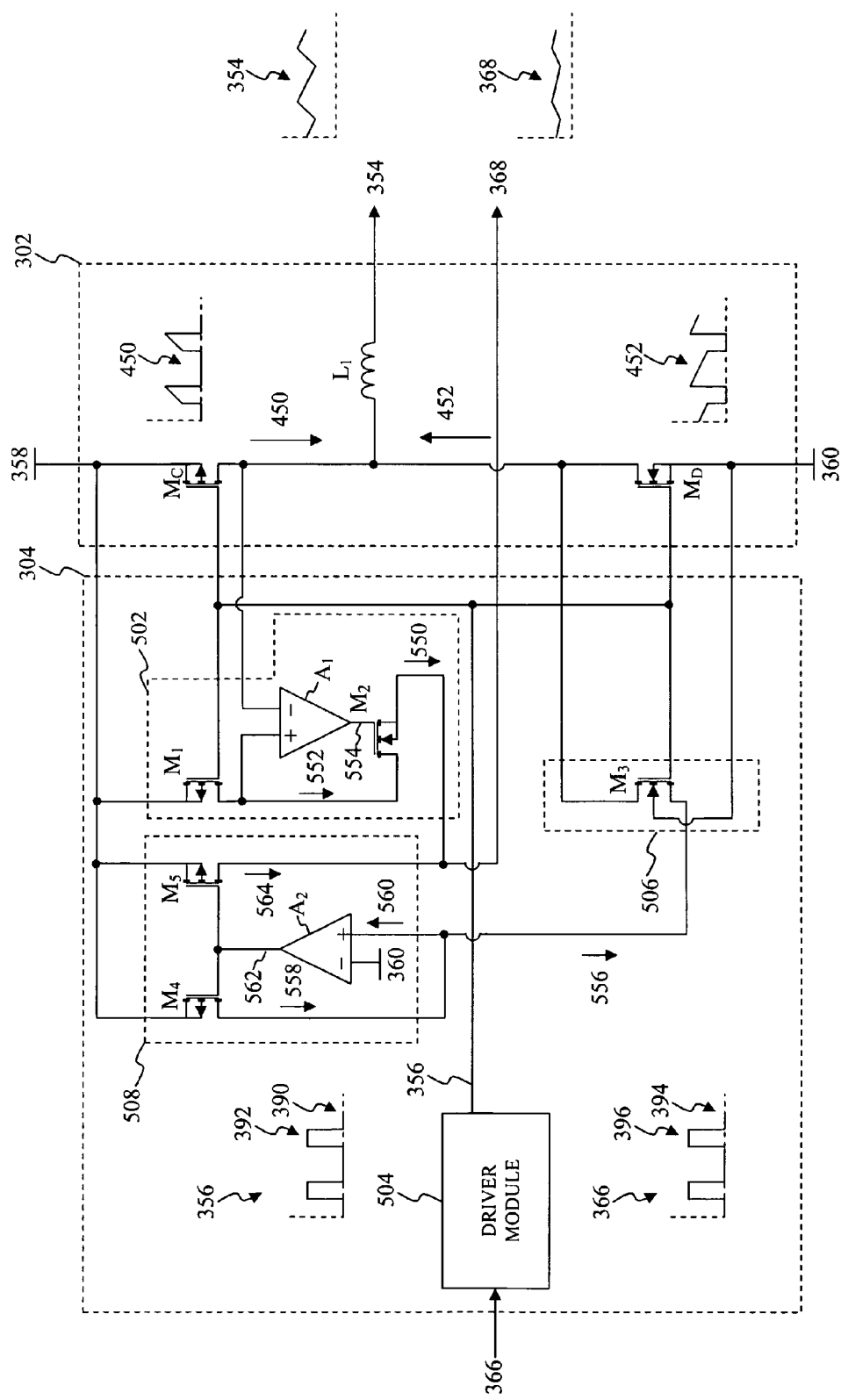
FIG. 5 illustrates a schematic block diagram of a controller module used in the voltage-mode buck regulator module according to an exemplary embodiment of the present invention.

FIG. 5 illustrates a schematic block diagram of a controller module used in the voltage-mode buck regulator module according to an exemplary embodiment of the present invention. The controller module 304 provides the charging control signal 356 based upon the PWM control signal 366. The charging transistor $M_C$ and the discharging transistor $M_D$ sources the element charging current 450 and the discharging transistor $M_D$ sinks the element discharging current 452 in response to the charging control signal 356. The element charging current 450 and the element discharging current 452 may be combined to provide the charging current 354 via the optional inductor $L_1$. Alternatively, the element charging current 450 and the element discharging current 452 may be directly combined to provide the charging current 354. The controller module 304 may additionally replicate the charging current 354 to provide the scaled charging current 368, the scaled charging current 368 being proportional to the charging current 354 by the first scaling factor.

The controller module 304 includes a charging current sensing module 502, a driver module 504, a discharging current sensing module 506, and a discharging current mirror 508. The charging current sensing module 502 observes or senses the element charging current 450 to source a sensed charging current 550. The charging current sensing module 502 includes a scaling transistor $M_1$, a sensing transistor $M_2$, and a comparator $A_1$. The scaling transistor $M_1$ sources a scaled charging current 552 based upon the first voltage 358 in response to the charging control signal 356. In an exemplary embodiment, the scaling transistor $M_1$ is implemented using a p-type metal oxide silicon (PMOS) transistor. In this exemplary embodiment, the scaling transistor $M_1$ sources the scaled charging current 552 when the charging control signal 356 is at the first voltage level 390, the first voltage level 390 being less than a threshold voltage of the scaling transistor $M_1$. In another exemplary embodiment, the scaling transistor $M_1$ is implemented having a width that is N times as smaller as a width of the charging transistor $M_C$. In this embodiment, the scaling transistor $M_1$ is proportional to the element charging current 450 by a first scaling factor of 1/N such that:

$$I_{P,S} = \frac{I_P}{N}, \quad (1)$$

where $I_{P,S}$ represents the scaled charging current 552 and $I_P$ represents the element charging current 450.

The comparator $A_1$ replicates a voltage drop across the charging transistor $M_C$. More specifically, the comparator $A_1$ compares a drain voltage of the scaling transistor $M_1$ and a drain voltage of the charging transistor $M_C$ to provide a sensing control signal 554. The comparator $A_1$ provides a first voltage level, such as a logical one to provide an example, as the sensing control signal 554 when the drain voltage of the scaling transistor $M_1$ is greater than or equal to the drain voltage of the charging transistor $M_C$. Alternatively, the comparator $A_1$ provides a second voltage level, such as a logical zero to provide an example, as the sensing control signal 554 when the drain voltage of the scaling transistor $M_1$ is less than the drain voltage of the charging transistor $M_C$. The sensing transistor $M_2$ modulates the scaled charging current 552 based upon the sensing control signal 554 to provide the sensed charging current 550, the sensed charging current 550 being proportional to the element charging current 450 by the first scaling factor. In an exemplary embodiment, the sensing transistor $M_2$ is implemented using an n-type metal oxide silicon (NMOS) transistor. In this exemplary embodiment, the sensing transistor $M_2$ provides the sensed charging current 550 when the sensing control signal 554 is at the second voltage level, the second voltage level being less than a threshold voltage of the sensing transistor $M_2$.

The driver module 504 provides the charging control signal 356 based upon the PWM control signal 366. The driver module 504 may provide the charging control signal 356 at the first voltage level 390 when the PWM control signal 366 is at the first voltage level 394. The driver module 504 may additionally provide the charging control signal 356 at the second voltage level 392 when the PWM control signal 366 is at the second voltage level 396. Alternatively, the driver module 504 may provide the charging control signal 356 at the first voltage level 390 when the PWM control signal 366 is at the second voltage level 396 and/or the charging control signal 356 at the second voltage level 392 when the PWM control signal 366 is at the first voltage level 394. The driver module 504 may adjust the PWM control signal 366 such that the first level 390 of charging control signal 356 is less than to the threshold voltage of the charging transistor $M_C$ and/or the scaling transistor $M_1$ and/or the second level 392 of charging control signal 356 is greater than or equal to the threshold voltage of the discharging transistor $M_D$ and/or a scaling transistor $M_3$.

The discharging current sensing module 506 sinks a sensed discharging current 556 from the discharging current mirror 508, the sensed discharging current 556 being proportional to the element discharging current 452. The discharging current sensing module 506 includes the scaling transistor $M_3$. The scaling transistor $M_3$ sinks the sensed discharging current 556 in response to the charging control signal 356. In an exemplary embodiment, the scaling transistor $M_3$ is implemented using an n-type metal oxide silicon (NMOS) transistor. In this exemplary embodiment, the scaling transistor $M_3$ sinks the sensed discharging current 556 when the charging control signal 356 is at the second voltage level 392, the second voltage level 392 being greater than or equal to a threshold voltage of the scaling transistor $M_3$. In another exemplary embodiment, the scaling transistor $M_3$ is implemented having a width that is N times as smaller as a width of the discharging transistor $M_D$. In this embodiment, the discharging current sensing module 506 sinks the sensed discharging current 556 that is proportional to the element discharging current 452 by the first scaling factor of 1/N such that:

$$I_{N,S} = \frac{I_N}{N}, \quad (2)$$

where $I_{N,S}$ represents the sensed discharging current 556 and $I_N$ represents the element discharging current 452.

The discharging current mirror 508 ensures that a scaled discharging current 564 is proportional to or mirrors the sensed discharging current 556. The discharging current mirror 508 includes a first mirroring transistor $M_4$, a second mirroring transistor $M_5$, and a comparator $A_2$. The first mirroring transistor $M_4$ provides a scaled discharging current 558 from the first input voltage 358 based upon a mirroring control signal 562. Likewise, the second mirroring transistor $M_5$ provides the scaled discharging current 564 from the first input voltage 358 based upon the mirroring control signal 562, the scaled discharging current 564 being proportional to the scaled discharging current 558. In an exemplary embodiment, the first mirroring transistor $M_4$ and the second mirroring transistor $M_5$ are both implemented using substantially similar widths such that the scaled discharging current 558 is substantially equivalent to the scaled discharging current 564.

The comparator $A_2$ replicates a voltage drop across the discharging transistor $M_D$. More specifically, the comparator $A_2$ compares a source voltage of the scaling transistor $M_3$ to the second input voltage 360 to provide the mirroring control signal 562. The comparator $A_2$ provides a first voltage level, such as a logical one to provide an example, as the mirroring control signal 562 when the source voltage of the scaling transistor $M_3$ is greater than or equal to the second input voltage 360. Alternatively, the comparator $A_2$ provides a second voltage level, such as a logical zero to provide an example, as the mirroring control signal 562 when source voltage of the scaling transistor $M_3$ is less than the second input voltage 360. In an exemplary embodiment, the first mirroring transistor $M_4$ and the second mirroring transistor $M_5$ are both implemented using p-type metal oxide silicon (PMOS) transistors. In this exemplary embodiment, the first mirroring transistor $M_4$ and the second mirroring transistor $M_5$ provide the scaled discharging current 558 and the scaled discharging current 564, respectively, when the mirroring control signal 562 is at the second voltage level, the second voltage level being less than a threshold voltage of the first mirroring transistor $M_4$ and the second mirroring transistor $M_5$.

Figure 6A:
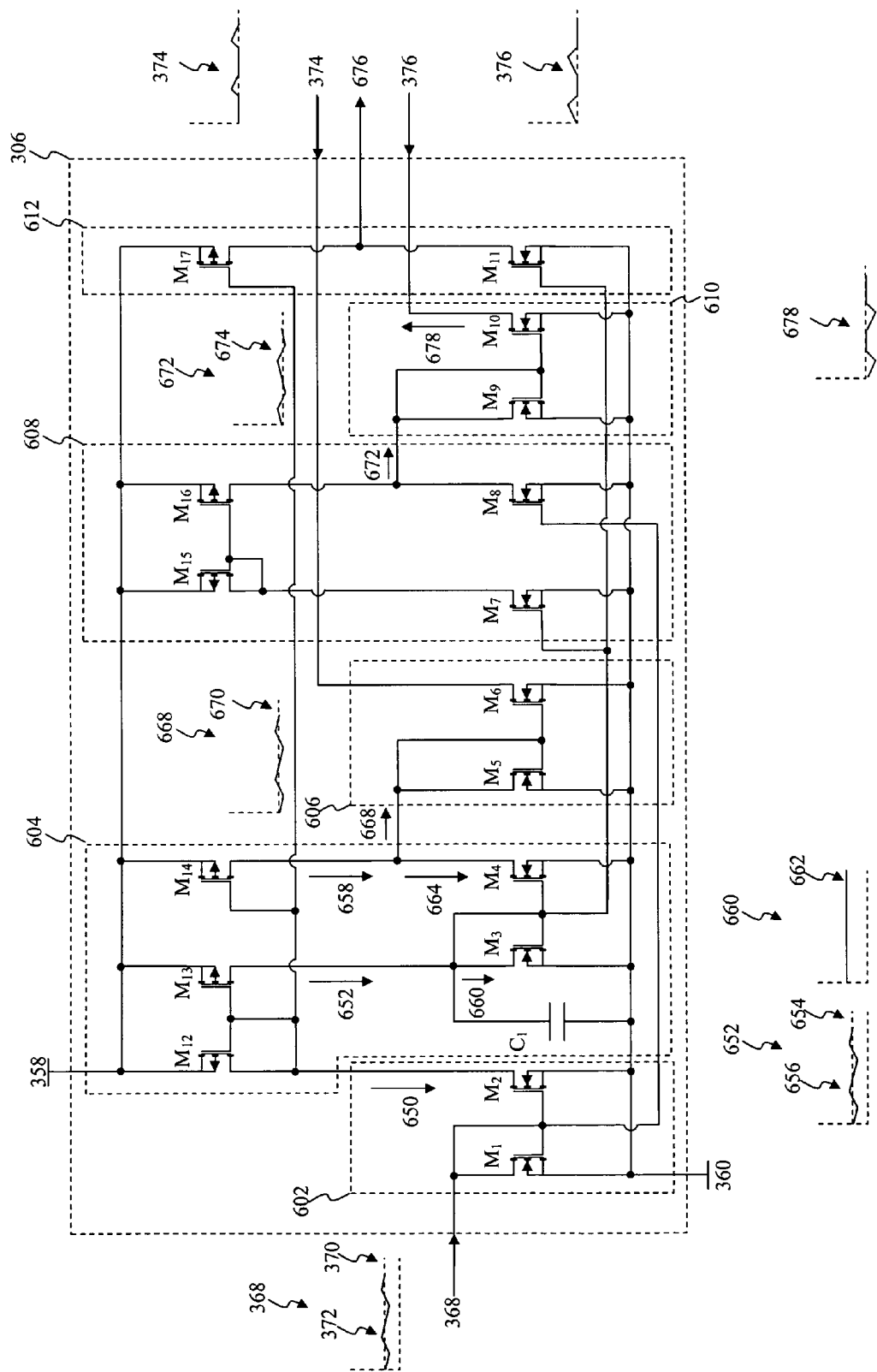
FIG. 6A illustrates a first schematic block diagram of a filter module used in the voltage-mode buck regulator module according to a first exemplary embodiment of the present invention.

FIG. 6A illustrates a first schematic block diagram of a filter module used in the voltage-mode buck regulator module according to a first exemplary embodiment of the present invention. The filter module 306 provides the positive undesired AC current component 374 and the positive undesired AC current component 376 based upon the scaled charging current 368. The positive undesired AC current component 376 represents an inverted negative of the undesired AC component 372. More specifically, the filter module 306 filters or removes the smooth DC component 370 from the scaled charging current 368 leaving the undesired AC component 372. The filter module 306 separates the undesired AC component 372 into a differential signal. The differential signal includes the positive undesired AC current component 374 that represents components of the undesired AC component 372 that are greater than or equal to the smooth DC component 370 and the positive undesired AC current component 376 that represents the absolute value of the components of the undesired AC component 372 that are less than the smooth DC power component 370.

The filter module 306 includes a first current mirror 602, a filter module 604, a second current mirror 606, a current subtractor 608, a third current mirror 610, and a clock generator module 612. The first current mirror 602 sinks a replicated scaled charging current 650 from the filter module 604 based upon the scaled charging current 368. The first current mirror 602 includes n-type metal oxide silicon (NMOS) transistors $M_1$ and $M_2$. The NMOS transistor $M_1$ receives the scaled charging current 368. The NMOS transistor $M_2$ copies or mirrors the scaled charging current 368 to sink the replicated scaled charging current 650 from filter module 604, the replicated scaled charging current 650 being proportional to the scaled charging current 368.

The filter module 604 provides a replicated undesired AC current component 668 based upon the replicated scaled charging current 650. The filter module 604 includes NMOS transistors $M_3$ and $M_4$, p-type metal oxide silicon (PMOS) transistors $M_{12}$ through $M_{14}$, and a capacitor $C_1$. The PMOS transistor $M_{12}$ sources the replicated scaled charging current 650 to the first current mirror 602. The PMOS transistor $M_{13}$ and the PMOS transistor $M_{14}$ mirrors the replicated scaled charging current 650 to provide a second replicated scaled charging current 652 and a second replicated scaled charging current 658, respectively, the second replicated scaled charging current 652 and/or the second replicated scaled charging current 658 being proportional to the replicated scaled charging current 650. The second replicated scaled charging current 652 includes a smooth DC component 654 and an undesired AC component 656, the smooth DC component 654 and the undesired AC component 656 being proportional to the smooth DC component 370 and the undesired AC component 372, respectively. The second replicated scaled charging current 658 includes a smooth DC component and an undesired AC component similar to the second replicated scaled charging current 652. The capacitor $C_1$ removes the undesired AC component 656 embedded within the second replicated scaled charging current 652 to provide a filtered replicated current 660. More specifically, the capacitor $C_1$ removes the undesired AC component 656 from the second replicated scaled charging current 652 to provide the filtered replicated current 660 having only a smooth DC component 662. The NMOS transistor $M_3$ receives the filtered replicated current 660. The NMOS transistor $M_4$ mirrors the filtered replicated current 660 to provide a replicated smooth DC component 664, the replicated smooth DC component 664 being proportional to the smooth DC component 662.

The second current mirror 606 provides the positive replica undesired AC current component 374 based upon a replicated undesired AC current component 668. The replicated undesired AC current component 668 represents a difference between the second replicated scaled charging current 658 and the replicated smooth DC component 664, namely an undesired AC component 670. The second current mirror 606 includes NMOS transistors $M_5$ and $M_6$. The NMOS transistor $M_5$ receives the replicated undesired AC current component 668. The NMOS transistor $M_6$ mirrors only those components of the replicated undesired AC current component 668 being greater than or equal to approximately zero to provide the positive replica undesired AC current component 374.

The current subtractor 608 combines the filtered replicated current 660 and the scaled charging current 368 to provide a replicated undesired AC current component 672, the replicated undesired AC current component 672 representing the absolute value of the undesired AC component 372. In other words, the replicated undesired AC current component 372 and the replicated undesired AC current component 672 are offset in phase by approximately 180-degrees. The current subtractor 608 includes NMOS transistors $M_7$ and $M_8$ and PMOS transistors $M_{15}$ and $M_{16}$. The current subtractor 608 subtracts the scaled charging current 368 from the smooth DC component 662 to provide the replicated undesired AC current component 672. The subtracting of the scaled charging current 368 from the smooth DC component 662, in effect, negates or inverts the replicated undesired AC current component 672.

The third current mirror 610 provides a negative undesired AC current component 678 based upon the scaled charging current 368 and the replicated undesired AC current component 672, the negative undesired AC current component 678 being a replica of the positive undesired AC current component 376. The third current mirror 610 includes NMOS transistors $M_9$ and $M_{10}$. The NMOS transistor $M_9$ receives the replicated undesired AC current component 672. The NMOS transistor $M_{10}$ mirrors the replicated undesired AC current component 672 to provide the negative undesired AC current component 678. The NMOS transistor $M_{10}$ mirrors only those components of the replicated undesired AC current component 672 that are greater than or equal to approximately zero to provide the negative undesired AC current component 678.

Figure 7:
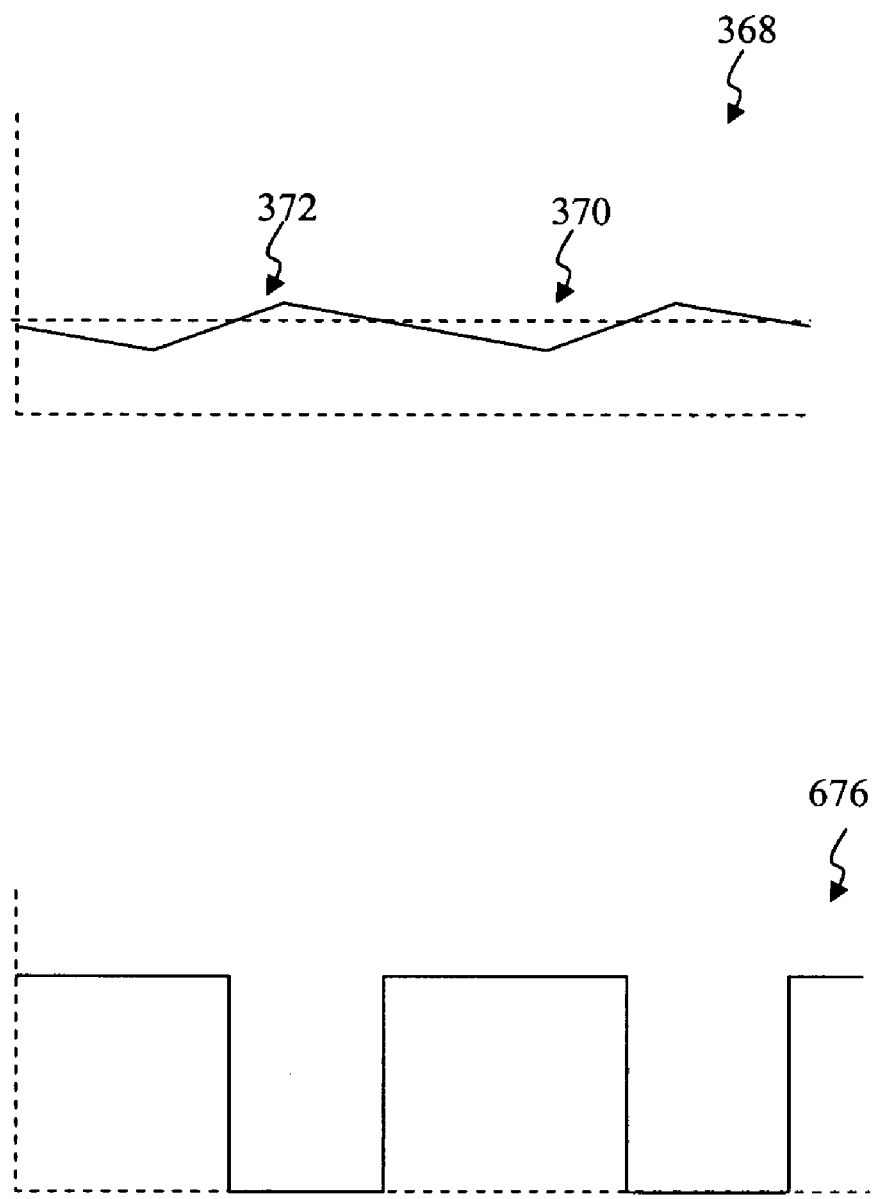
FIG. 7 illustrates a clocking signal provided by the filter module according to an exemplary embodiment of the present invention.

The scaled charging current 368, or any replication thereof such as the replicated scaled charging current 650 and/or the second replicated scaled charging current 652 to provide some examples, may be used to derive a clocking signal 676. FIG. 7 illustrates a clocking signal provided by the filter module according to an exemplary embodiment of the present invention. The clocking signal 676 may include a first voltage level, such as a logic zero to provide an example, when the scaled charging current 368 is greater than or equal to the smooth DC power component 370. The clocking signal 676 may include a second voltage level, such as a logic one to provide an example, when the scaled charging current 368 is less than the smooth DC component 370.

Referring back to FIG. 6A, the clock generator module 612 includes an NMOS transistor $M_{11}$ and a PMOS transistor $M_{17}$. The NMOS transistor $M_{11}$ provides the second input voltage 360 as the clocking signal 676 when the second replicated scaled charging current 652 is less than smooth DC component 654. Alternatively, the PMOS transistor $M_{17}$ provides the first input voltage 358 as the clocking signal 676 when the replicated scaled charging current 650 is greater than the smooth DC component 654.

Figure 6B:
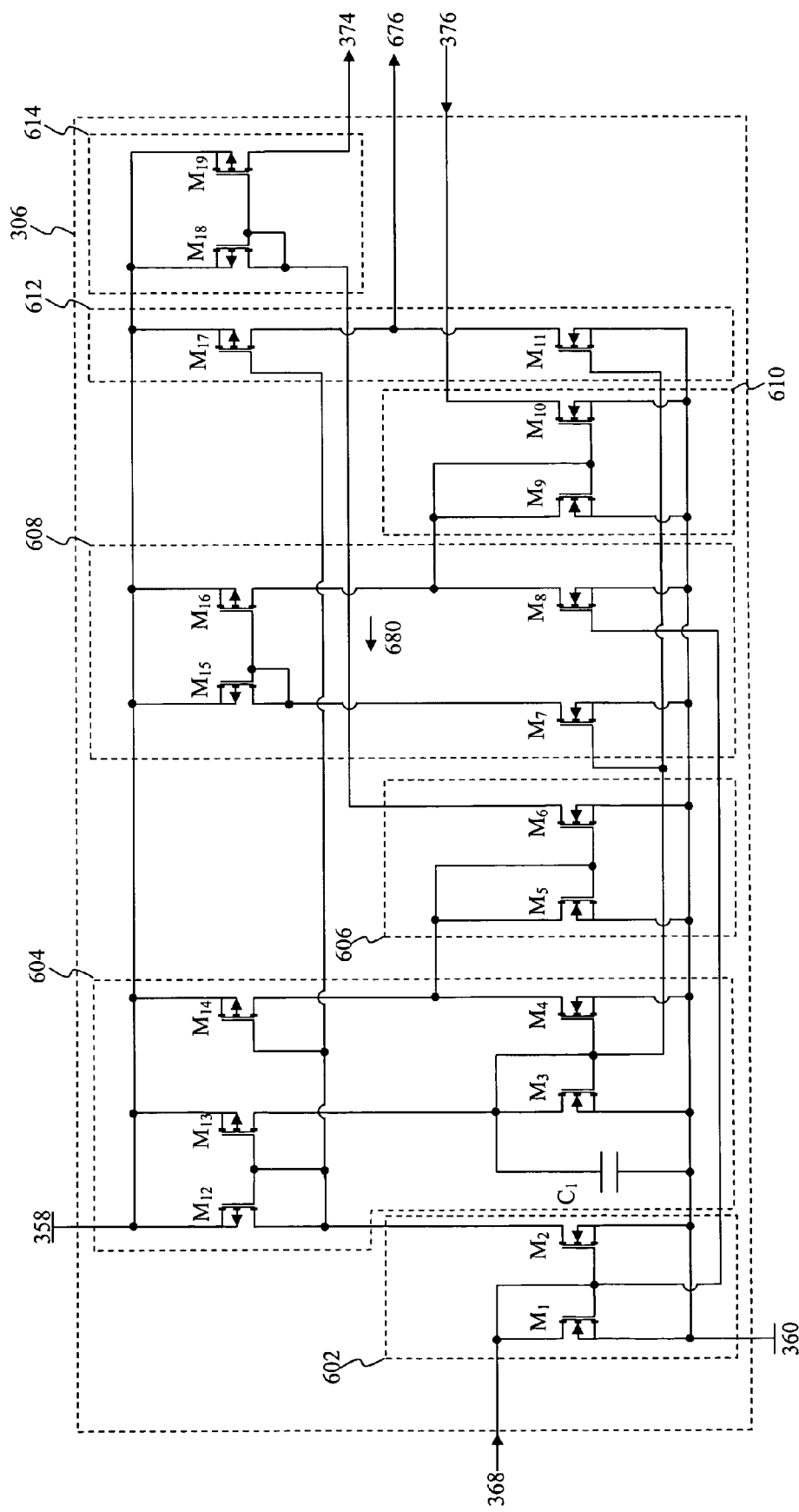
FIG. 6B illustrates a second schematic block diagram of the filter module used in the voltage-mode buck regulator module according to a second exemplary embodiment of the present invention.

FIG. 6B illustrates a second schematic block diagram of the filter module used in the voltage-mode buck regulator module according to a second exemplary embodiment of the present invention. The filter module 306 provides the positive undesired AC current component 374 and the positive undesired AC current component 376 based upon the scaled charging current 368. More specifically, the filter module 306 filters or removes the smooth DC component 370 from the scaled charging current 368 leaving the undesired AC component 372. The filter module 306 separates the undesired AC component 372 into a differential signal. The differential signal includes the positive undesired AC current component 374 that represents components of the undesired AC component 372 that are greater than or equal to the smooth DC component 370 and the positive undesired AC current component 376 that represents the components of the undesired AC component 372 that are less than the smooth DC power component 370. The filter module 306 includes the first current mirror 602, the filter module 604, the second current mirror 606, the current subtractor 608, the third current mirror 610, the clock generator module 612, and a fourth current mirror 614. The filter module 306 as shown in FIG. 6B operates in a substantially similar manner as the filter module shown in FIG. 6A; therefore, only differences between the filter module 306 as shown in FIG. 6A and the filter module shown in FIG. 6B will be described in further detail.

The fourth current mirror 614 provides a positive undesired AC current component 374 based upon an undesired AC current component 680, the positive undesired AC current component 680 being provided by the second current mirror 606 in a substantially similar manner as the positive replica undesired AC current component 374 as shown in FIG. 6A. The fourth current mirror 614 includes PMOS transistors $M_{18}$ and $M_{19}$. The PMOS transistor $M_{18}$ receives the positive undesired AC current component 680. The PMOS transistor $M_{19}$ mirrors the positive undesired AC current component 680 to provide the positive undesired AC current component 374. The PMOS transistor $M_{19}$ mirrors only those components of the replicated undesired AC current component 672 that are greater than or equal to approximately zero to provide the positive undesired AC current component 374.

Figure 8:
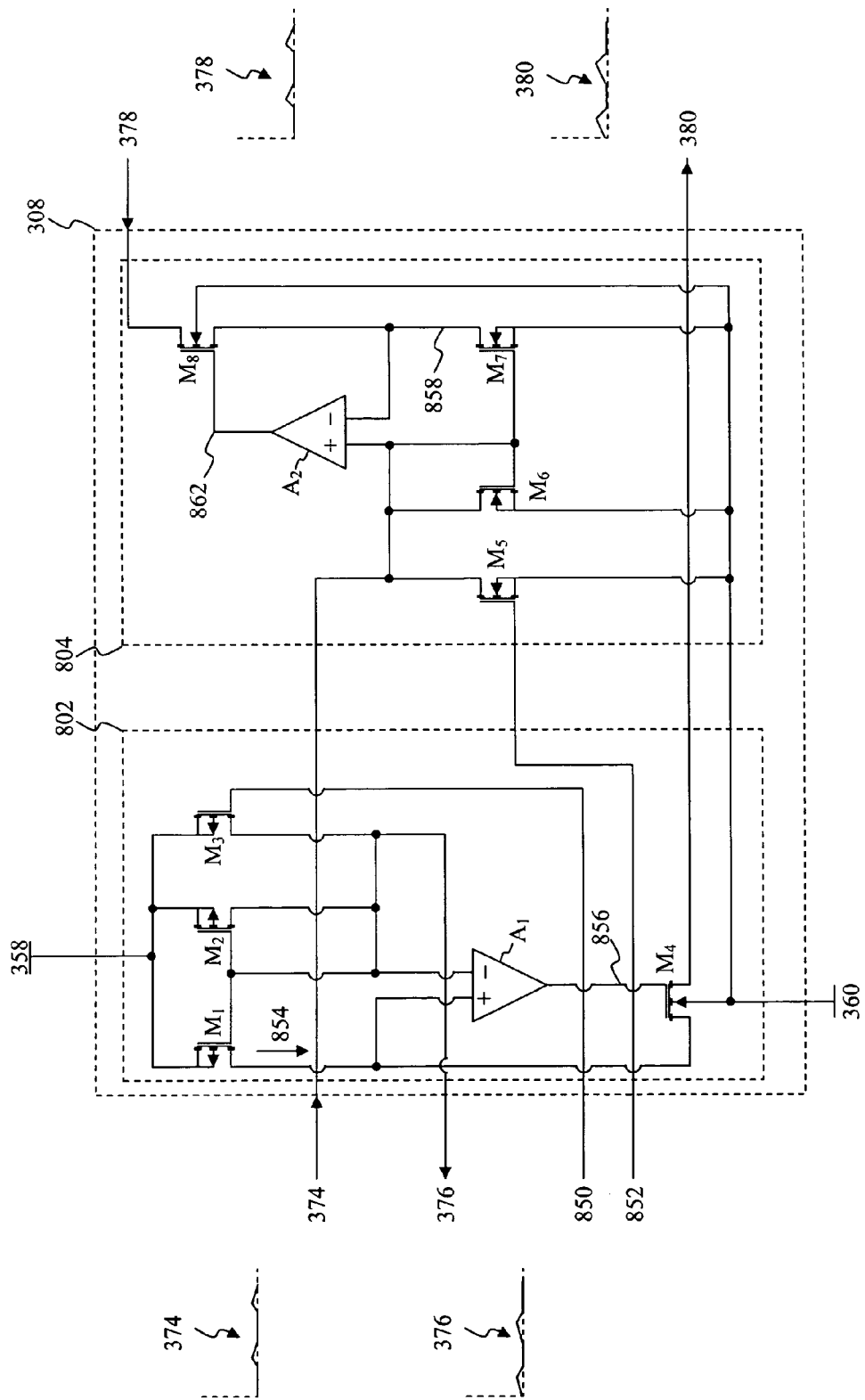
FIG. 8 illustrates a schematic block diagram of a noise module used in the voltage-mode buck regulator module according to a first exemplary embodiment of the present invention.

FIG. 8 illustrates a schematic block diagram of a noise module used in the voltage-mode buck regulator module according to a first exemplary embodiment of the present invention. The noise module 308 scales the positive undesired AC current component 374 and the positive undesired AC current component 376 by the second scaling factor to provide the positive replica undesired AC power 378 and the positive replica undesired AC component 380. In an exemplary embodiment, the second scaling factor is an inverse of the first scaling factor used by the controller module 304. The noise module 308 includes a first current mirror 802 and a second current mirror 804.

The first current mirror 802 sources the positive replica undesired AC component 380 based upon the positive undesired AC current component 376 in accordance with a first clocking signal 850. The first clocking signal 850 may represent an exemplary embodiment of the clocking signal 676. The first current mirror 802 includes p-type metal oxide silicon (PMOS) transistors $M_1$ through $M_4$ and a comparator $A_1$. The PMOS transistor $M_2$ sources the positive undesired AC current component 376 from the first input voltage 358. The PMOS transistor $M_1$ copies or mirrors the positive undesired AC current component 376 to provide a replicated positive undesired AC power component 854, the replicated positive undesired AC power component 854 being proportional to the positive undesired AC current component 376 by the second scaling factor. In an exemplary embodiment, the PMOS transistor $M_2$ is implemented having a width that is N times as smaller as a width of the PMOS transistor $M_1$. In this embodiment, the PMOS transistor $M_1$ provides the replicated positive undesired AC power component 854 that is proportional to the positive undesired AC current component 376 by the second scaling factor of N. The PMOS transistor $M_3$ receives the first clocking signal 850. The PMOS transistor $M_3$ couples a gate terminal of the PMOS transistor $M_2$ and a source terminal of the PMOS transistor $M_2$ to the first input voltage 358 when the first clocking signal 850 is at a first voltage level, such as a logic zero to provide an example, the first voltage level being less than a threshold voltage of the PMOS transistor $M_3$. As a result, the PMOS transistor $M_1$ does not provide the replicated positive undesired AC power component 854.

The comparator $A_1$ compares a difference between a drain voltage of the PMOS transistor $M_1$ and a drain voltage of the PMOS transistor $M_2$ to provide a scaling control signal 856 to the PMOS transistor $M_4$. The comparator $A_1$ provides a first voltage level, such as a logical one to provide an example, as the scaling control signal 856 when the drain voltage of the PMOS transistor $M_1$ is greater than or equal to the drain voltage of the PMOS transistor $M_2$. Alternatively, the comparator $A_1$ provides a second voltage level, such as a logical zero to provide an example, as the scaling control signal 856 when the drain voltage of the PMOS transistor $M_1$ is less than the drain voltage of the PMOS transistor $M_2$. The PMOS transistor $M_4$ sources positive replica undesired AC component 380 based upon the scaling control signal 856, the positive replica undesired AC component 380 being proportional to the positive undesired AC current component 376.

The second current mirror 804 provides the positive replica undesired AC power 378 based upon the positive undesired AC current component 374 in accordance with a second clocking signal 852. In an exemplary embodiment, the second clocking signal 852 is substantially similar to the first clocking signal 850. In this exemplary embedment, the first clocking signal 850 and the second clocking signal 852 may be combined into a single clocking signal. The second current mirror 804 includes n-type metal oxide silicon (NMOS) transistors $M_5$ through $M_8$ and a comparator $A_2$. The second current mirror 804 operates in a substantially similar manner as the first current mirror 802, except with the use of NMOS transistors; therefore, the second current mirror 804 will not be described in further detail.

Figure 9:
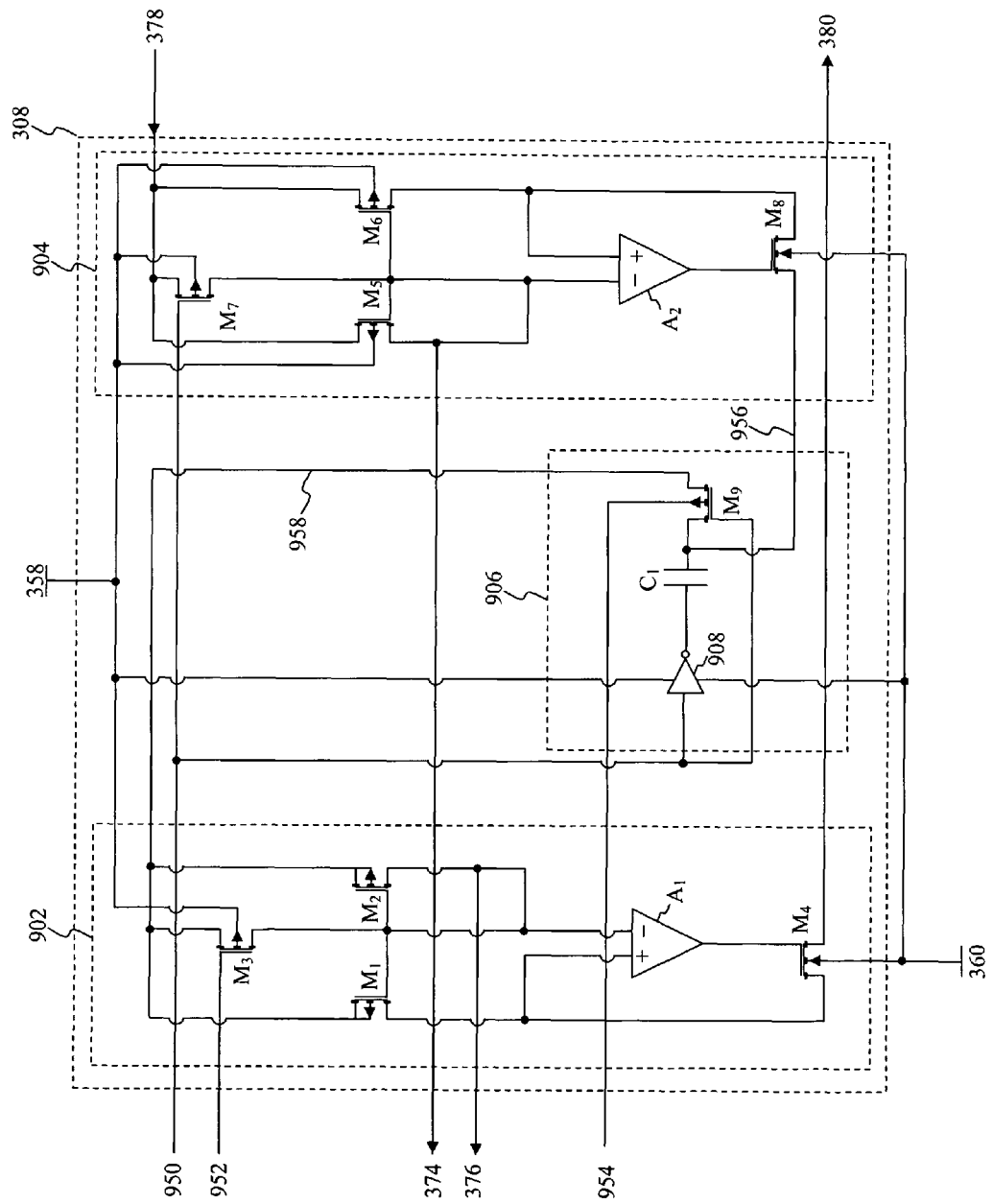
FIG. 9 illustrates a schematic block diagram of the noise module used in the voltage-mode buck regulator module according to a second exemplary embodiment of the present invention.

FIG. 9 illustrates a schematic block diagram of the noise module used in the voltage-mode buck regulator module according to a second exemplary embodiment of the present invention. The noise module 308 scales the positive undesired AC current component 374 and the positive undesired AC current component 376 by the second scaling factor to provide the positive replica undesired AC power 378 and the positive replica undesired AC component 380. In an exemplary embodiment, the second scaling factor is an inverse of the first scaling factor used by the controller module 304. The noise module 308 includes a first current mirror 902, a second current mirror 904, and a charge pumping module 906.

The first current mirror 902 provides the positive replica undesired AC component 380 based upon the positive undesired AC current component 376 in accordance with a first clocking signal 952. The first clocking signal 952 may represent a replica of the clocking signal 676. The first current mirror 802 includes p-type metal oxide silicon (PMOS) transistors $M_1$ through $M_3$, an n-type metal oxide silicon (NMOS) transistor $M_5$, and a comparator $A_1$. The first current mirror 902 operates in a substantially similar manner as the first current mirror 802; therefore, only differences between the first current mirror 902 and the first current mirror 802 will be described in further detail.

The PMOS transistors $M_1$ through $M_3$ are coupled to a second charging voltage 958 provided by the charge pumping module 906 instead of the first input voltage 358. Unlike the PMOS transistor $M_3$ of the first current mirror 802, the PMOS transistor $M_3$ of the first current mirror 902 couples a gate terminal of the PMOS transistor $M_1$ and the PMOS transistor $M_2$ to the second charging voltage 958 when the first clocking signal 952 is at a first voltage level, such as a logic zero to provide an example, the first voltage level being less than a threshold voltage of the PMOS transistor $M_3$. In an exemplary embodiment, the second clocking signal 952 represents a replica of the first clocking signal 676. As a result, the first current mirror 902 does not provide the positive replica undesired AC component 380.

The second current mirror 904 provides the positive replica undesired AC power 378 based upon the positive undesired AC current component 374 in accordance with a second clocking signal 950. The second current mirror 904 includes p-type metal oxide silicon (PMOS) transistors $M_5$ through $M_7$, an n-type metal oxide silicon (NMOS) transistor $M_8$, and a comparator $A_2$. The second current mirror 904 operates in a substantially similar manner as the first current mirror 902; therefore, only differences between the second current mirror 904 and the first current mirror 902 will be described in further detail.

Unlike the PMOS transistor $M_3$ of the first current mirror 902, the PMOS transistor $M_7$ of the second current mirror 904 couples a gate terminal of the PMOS transistor $M_5$ and the PMOS transistor $M_6$ to the positive replica undesired AC power 378 when the second clocking signal 950 is at a first voltage level, such as a logic zero to provide an example, the first voltage level being less than a threshold voltage of the PMOS transistor $M_7$. As a result, the second current mirror 904 does not provide the positive replica undesired AC power 378. In addition, the NMOS transistor $M_8$ is coupled to a first charging voltage 956 provided by the charge pumping module 906 instead of the positive replica undesired AC power 378. As a result, the positive replica undesired AC power 378 is provided by the PMOS transistor $M_6$.

The charge pumping module 906 provides the first charging voltage 956 and the second charging voltage 958 based upon the second clocking signal 950. The charge pumping module includes an inverter 908, a capacitor $C_1$, and a p-type metal oxide silicon (PMOS) transistor $M_9$. The inverter 908 inverts the second clocking signal 950. The first charging voltage 956 then flows through the PMOS transistor $M_9$ that is clocked by the second clocking signal 950 to provide the second charging voltage 958. The bulk of the PMOS transistor $M_9$ is coupled to a bulk bias voltage 954, the bulk bias voltage 954 representing a maximum of either the first charging voltage 956 or the second charging voltage 958. The bulk bias voltage 954 operates to prohibit conduction of a body diode of the PMOS transistor $M_9$.

Figure 10:
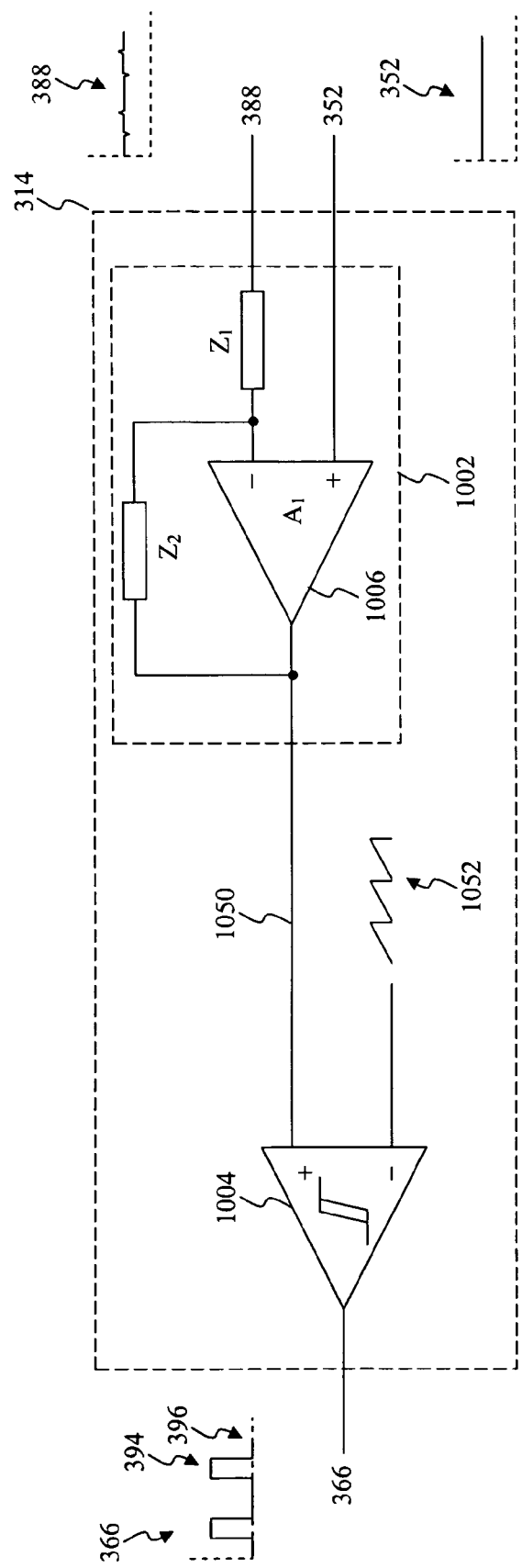
FIG. 10 illustrates a schematic block diagram of the pulse width modulator (PWM) used in the voltage-mode buck regulator module according to an exemplary embodiment of the present invention.

FIG. 10 illustrates a schematic block diagram of the pulse width modulator (PWM) used in the voltage-mode buck regulator module according to an exemplary embodiment of the present invention. The PWM 314 provides the PWM control signal 366 by comparing a sensed output voltage 388 to the reference voltage 352. The PWM 314 provides the PWM control signal 366 having the first voltage level 394 when an error voltage 1050 is greater than or equal to a reference pulse 1052. Alternatively, the PWM 314 provides the PWM control signal 366 having the second voltage level 396 when the error voltage 1050 is less than the reference pulse 1052. The PWM 314 includes a difference module 1002 and a comparator 1004.

The difference module 1002 includes an operational amplifier 1006 coupled to a first impedance $Z_1$, the first impedance $Z_1$ having a first termination connected to an inverting input of the operational amplifier 1006 and a second termination to receive the sensed output voltage 388. The difference module 1002 additionally includes a second impedance $Z_2$ coupled between the inverting input and an output of the operational amplifier 1006. The operational amplifier 1006 further includes a non-inverting input to receive the reference voltage 352. Assuming that the second impedance $Z_2$ is infinite at substantially zero Hertz, referred to as DC, the difference module 1002 provides an error voltage 1050 that is proportional to a difference between the reference voltage 352 and the sensed output voltage 388.

The comparator 1004 compares the error voltage 1050 to a reference pulse 1052, such as a saw tooth pulse to provide an example, to provide the PWM control signal 366. More specifically, the comparator 1004 provides the PWM control signal 366 having the first voltage level 394 when the error voltage 1050 is greater than the reference pulse 1052. Alternatively, the comparator 1004 provides the PWM control signal 1052 having the second voltage level 396 when the error voltage 1050 is less than the reference pulse 1052.

Figure 11:
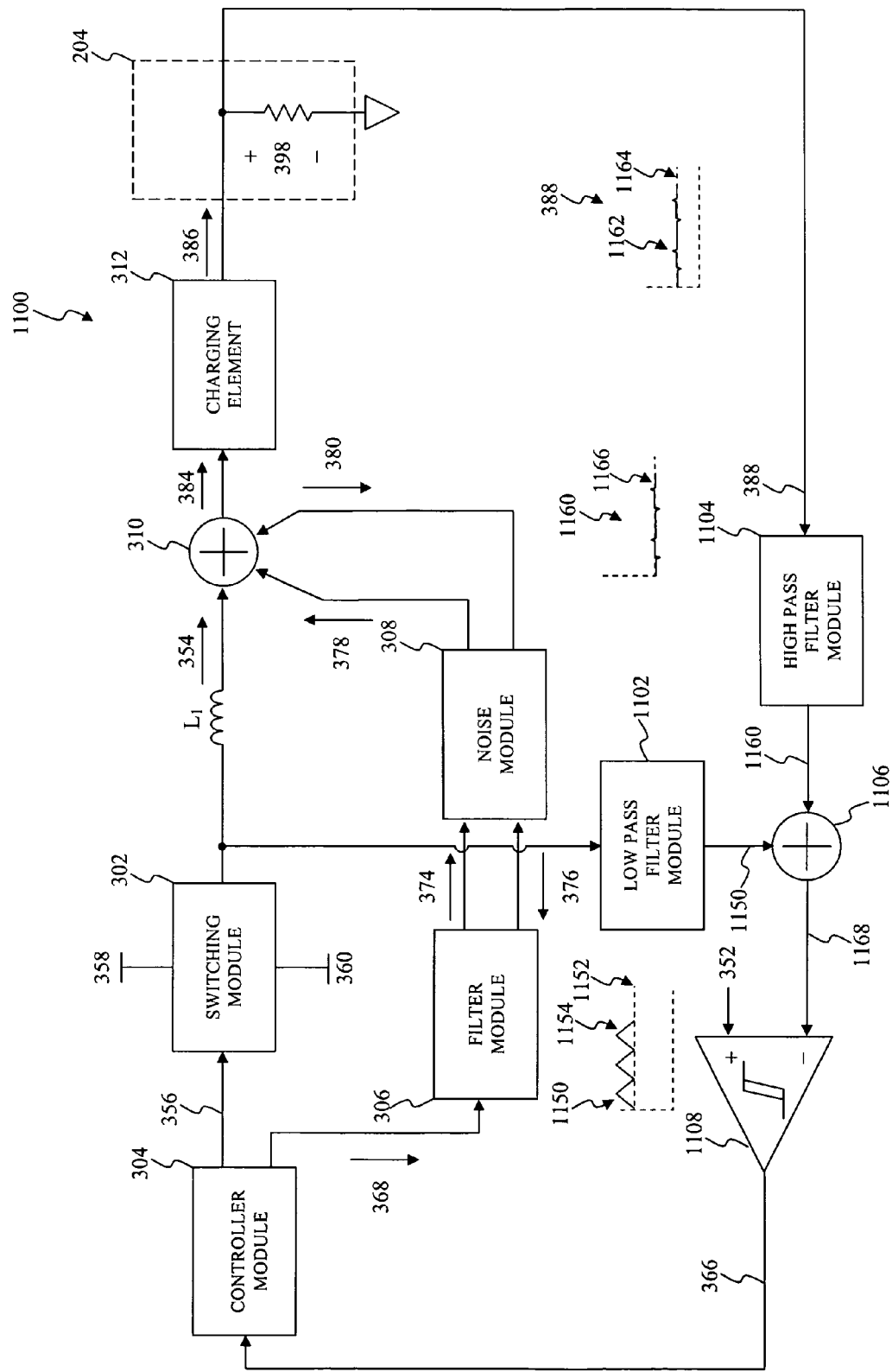
FIG. 11 illustrates a functional block diagram of a hysteretic buck regulator module with hysteresis used in a power management unit according to an exemplary embodiment of the present invention.

FIG. 11 illustrates a functional block diagram of a hysteretic buck regulator module with hysteresis used in a power management unit according to an exemplary embodiment of the present invention. The PMU 110 may include one or more buck regulator modules 1100 to provide one or more output powers for operation of the cellular phone 100. Each hysteretic buck regulator module 1100 provides an output power, including the output current 386 and/or the output voltage 398 based upon an input power from the battery 112 or any other suitable source. The buck regulator module 1100 regulates the input power such that a smooth direct current (DC) power component of the output power closely approximates a reference power. Like the conventional buck regulator module 200 as discussed above, the output power provided by the buck regulator module 1100 additionally includes an undesired alternating current (AC) power component. The undesired AC power component embedded within the output power of the buck regulator module 1100, however, is substantially less than the undesired AC power component embedded within the output power provided by the conventional buck regulator module 200.

The buck regulator module 1100 includes the load 204, the switching module 302, the controller module 304, the filter module 306, the noise module 308, the combination module 310, the charging element 312, the pulse width modulator (PWM) 316, a low pass filter module 1102, a high pass filter module 1104, a second combination module 1106, and a hysteretic comparator 1108. The buck regulator module 1100 operates in a substantially similar manner as the buck regulator module 300 with the addition of hysteresis; therefore, only differences between the buck regulator module 1100 and the buck regulator module 300 will be described in further detail.

The switching module 302 provides the charging current 354 by continuously switching between the first input voltage 358 and the second input voltage 360 in response to the charging control signal 356 in a similar manner as described above. Similar to the charging current 354 as described above, the continuous switching between the first input voltage 358 and the second input voltage 360 in this manner provides a PWM voltage at the output of the switching module 302. The switching module 302 is implemented without the optional inductor $L_1$ as described above. As shown in FIG. 11, the optional inductor $L_1$ is located outside of the switching module 302.

The low pass filter module 1102 provides a triangular shaped voltage 1150 based upon the PWM voltage at the output of the switching module 302, the triangular shaped voltage 1150 including a smooth DC component 1152 and a triangular AC component 1154.

The high pass filter module 1104 provides a filtered sensed output voltage 1160 based upon the sensed output voltage 388. The sensed output voltage 388 may include an undesired AC component 1162 and a smooth DC component 1164. The high pass filter module 1104 removes or filters out at least some of the smooth DC component 1164 from the sensed output voltage 388 to provide the filtered sensed output voltage 1160. In an exemplary embodiment, the high pass filter module 1104 filters out the smooth DC component 1164, in its entirety, to provide the filtered sensed output voltage 1160 having an undesired AC component 1166.

The second combination module 1106 combines the triangular shaped voltage 1150 and the filtered sensed output voltage 1160 to provide a hysteretic output voltage 1168. In an exemplary embodiment, the second combination module 1106 combines the triangular AC component 1154 and the undesired AC component 1166 to provide the hysteretic output voltage 1168.

The hysteretic comparator 1106 provides the PWM control signal 366 by comparing the hysteretic output voltage 1168 to the reference voltage 352 in a substantially similar manner as described above.

Figure 12:
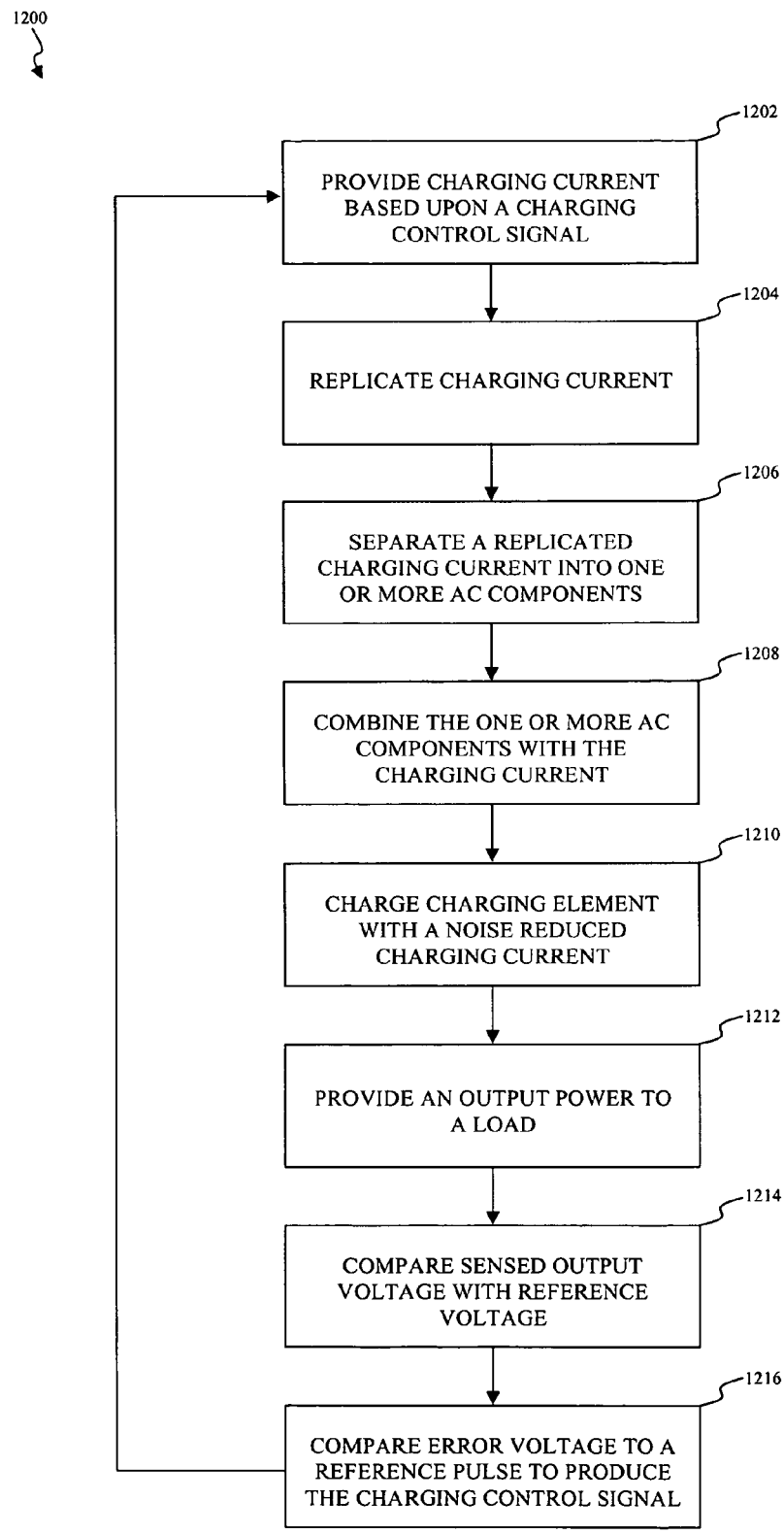
FIG. 12 is a flowchart of exemplary operational steps of the voltage-mode buck regulator module used in a power management unit according to an exemplary embodiment of the present invention.

FIG. 12 is a flowchart 1200 of exemplary operational steps of the voltage-mode buck regulator module used in a power management unit according to an exemplary embodiment of the present invention. The invention is not limited to this operational description. Rather, it will be apparent to persons skilled in the relevant art(s) from the teachings herein that other operational control flows are within the scope and spirit of the present invention. The following discussion describes the steps in FIG. 12.

At step 1202, the operational control flow provides a charging current based upon a charging control signal. More specifically, the operational control flow may use one or more switches, such as the switching module 302 to provide an example, to continuously switch between a first input voltage, such as an input voltage from a battery to provide an example, and a second input voltage, such as a ground potential to provide an example, in response to the charging control signal. The operational control flow may provide the charging current based upon the first input voltage when the charging control signal is at a first voltage level, such as a logic zero to provide an example. Alternatively, the operational control flow may provide the charging current based upon the second input voltage when the charging control signal is at a second voltage level, such as a logic one to provide an example. The continuous switching between the first input voltage and the second input voltage in this manner, as well as a charging and/or discharging time constant of a charging element, causes an undesired AC component to be embedded within a smooth DC component of the charging current. The smooth DC component represents an average of the charging current At step 1204, the operational control flow replicates the charging current from step 1202 to provide a scaled charging current, the scaled charging current being proportional to the charging current from step 1202 by a first scaling factor. The operational control flow may sense the charging current from step 1202 using one or more sensing modules, such as the charging current sensing module 502 and the discharging current sensing module 506 to provide some examples. The operational control flow may replicate the sensed charging current use one or more current mirrors, such as the charging current sensing module 502 and the discharging current mirror 508 to provide some examples, to provide the scaled charging current. The scaled charging current includes a smooth DC component and an undesired AC component, the smooth DC component and the undesired AC component of step 1204 being proportional to the smooth DC component and the undesired AC component, respectively, from step 1202. In an exemplary embodiment, the operational control flow reduces the charging current from step 1202 by the first scaling factor to provide the scaled charging current. In this exemplary embodiment, the scaled charging current includes the smooth DC component and the undesired AC component, each of which have been reduced or scaled from the smooth DC component and the undesired AC component, respectively, by the first scaling factor.

At step 1206, the operational control flow separates the undesired AC component from step 1204 into one or more undesired AC components, such as the positive undesired AC current component 374 and the positive undesired AC current component 376 to provide some examples, based upon the scaled charging current from step 1204. More specifically, the operational control flow may use a filter module, such as the filter module 306 to provide an example, to filter or remove the smooth DC component from step 1204 from the scaled charging current from step 1204 leaving the undesired AC component from step 1204. The operational control flow may then use the filter module to separate the undesired AC component from step 1204 into the one or more undesired AC components. In an exemplary embodiment, the operational control flow may additional use a noise module, such as the noise module 308 to provide an example, to increase the one or more undesired AC components by a second scaling factor, the second scaling factor being an inverse of the first scaling factor from step 1204. In this exemplary embodiment, each of the one or more undesired AC components have been increased or scaled undesired AC component from step 1204 by the second scaling factor such that, when combined, the one or more undesired AC components substantially approximate the undesired AC component embedded within the charging current from step 1202.

At step 1208, the operational control flow combines the charging current from step 1202 with the one or more undesired AC components from step 1204 to provide a noise reduced charging current. In an exemplary embodiment, the operational control flow combines the one or more undesired AC components from step 1204 from the charging current from step 1202. The combining of the one or more undesired AC components from step 1204 and the charging current from step 1202 substantially reduces the undesired AC component embedded within the charging current from step 1202.

At step 1210, the operational control flow charges and/or discharges a charging element, such as the charging element 312 to provide an example, based upon the noise reduced charging current from step 1208. The operational control flow may charge any combination of passive elements such as resistors, capacitors, and/or inductors to provide some examples, and/or any combination of active elements such one or more transistors to provide an example.

At step 1212, the operational control flow provides the charge stored in the charging element from step 1210 to a load, such as the cellular phone 100 to provide an example.

At step 1214, the operational control flow compares a sensed output voltage with a reference voltage to provide an error voltage, the sensed output voltage being proportional to the charge stored in the charging element from step 1210. The operational control flow may use a difference module, such as the difference module 1002 to provide an example, to compare the sensed output voltage with the reference voltage. The error voltage is proportional to a difference between the reference voltage and the sensed output voltage. The operational control flow minimizes the error voltage by adjusting the charge stored in the charging element from step 1210 such that the sensed output voltage closely approximates the reference voltage.

At step 1216, the operational control flow compares the error voltage from step 1214 with a reference pulse, such as a saw tooth pulse to provide an example. The operational control flow may use a comparator to provide the charging control signal to step 1202 having the first voltage level when the sensed output voltage from 1214 is less than the reference pulse. Alternatively, the operational control flow may use the comparator to provide the charging control signal to step 1202 having the second voltage level when the sensed output voltage from step 1214 is greater than or equal to the reference pulse. The operational control flow may additionally increase and/or decrease the charging control signal using a driver module, such as the driver module 504 to provide an example, before providing the charging control signal to step 1202.

CONCLUSION

It is to be appreciated that the Detailed Description section, and not the Abstract section, is intended to be used to interpret the claims. The Abstract section may set forth one or more, but not all exemplary embodiments, of the present invention, and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the invention. Thus, the present invention should not be limited by any of the above-described exemplary embodiments, but should be defined only in accordance with the following claims and their equivalents.

What is claimed is:

1. A switching voltage regulator, comprising:
   a switching module configured to provide a charging current in response to a charging control signal;
   a controller module configured to provide the charging control signal based upon a pulse width modulator (PWM) control signal and to replicate the charging current to provide a scaled charging current;
   a filter module configured to provide one or more undesired components based upon the scaled charging current;
   a noise module configured to scale the one or more undesired components to provide one or more replica undesired components;
   a combination module configured to combine the one or more undesired components and the charging current to provide a noise reduced charging current; and
   a pulse width modulator (PWM) configured to provide the (PWM) control signal based upon the noise reduced charging current.

2. The switching regulator of claim 1, wherein the switching module is configured to switch between a first input voltage and a second input voltage in response to the charging control signal.

3. The switching regulator of claim 2, wherein the first input voltage is provided from a battery of a cellular phone.

4. The switching regulator of claim 1, wherein the switching module comprises:
   a charging transistor configured to provide an element charging current when the charging control signal is at a first voltage level; and
   a discharging transistor configured to provide an element discharging current when the charging control signal is at a second voltage level, the charging current being a combination of the element charging current and the element discharging current.

5. The switching regulator of claim 1, wherein the scaled charging current is proportional to the charging current by a scaling factor.

6. The switching regulator of claim 1, wherein the controller module comprises:
   a charging current sensing module configured to sense a first portion of the charging current to provide a scaled charging current, the scaled charging current being proportional to the first portion of the charging current by a first scaling factor;
   a discharging current sensing module configured to sense a second portion of the charging current to provide a first scaled discharging current, the first scaled discharging current being proportional to the second portion of the charging current by the first scaling factor; and
   a discharging current mirror configured to mirror the first scaled discharging current to provide a second scaled discharging current,
   wherein the scaled charging current and the second scaled discharging current are combined to provide the scaled charging current.

7. The switching regulator of claim 6, wherein the controller module comprises:
   a driver module configured to provide the charging control signal based upon the pulse width modulator control signal.

8. The switching regulator of claim 1, wherein the one or more undesired components are proportional to an absolute value of an undesired alternating current (AC) component embedded within the charging current.

9. The switching regulator of claim 1, wherein the filter module is configured to remove a smooth direct current (DC) current embedded within the scaled charging current to provide an undesired alternating current (AC) component and to separate the undesired AC component into the one or more undesired components.

10. The switching regulator of claim 1, wherein the filter module comprises:
- a first current mirror configured to provide a replicated scaled charging current based upon the scaled charging current;
- a filter module configured to provide a first replicated undesired AC component based upon the replicated scaled charging current;
- a second current mirror configured to provide a first undesired component from among the one or more undesired components based upon the first replicated undesired AC component;
- a current subtractor configured to combine the scaled charging current and a smooth direct current (DC) component embedded within the scaled charging current to provide a second replicated undesired AC component; and
- a third current mirror configured to provide a second undesired component from among the one or more undesired components based upon the second replicated undesired AC component.

11. The switching regulator of claim 1, wherein the noise module comprises:
- a first current mirror configured to scale a first undesired component from among the one or more one or more undesired components to provide a first replica undesired component from among the one or more replica undesired components; and
- a second current mirror configured to scale a second undesired component from among the one or more one or more undesired components to provide a second replica undesired component from among the one or more replica undesired components.

12. The switching regulator of claim 11, wherein at least one of a group consisting of the first current mirror and the second current mirror is configured to scale their respective undesired component by a scaling factor, the scaling factor being an inverse of a second scaling factor used by the controller module.

13. The switching regulator of claim 11, wherein the noise module further comprises:
- a charge pumping module configured to provide a first charging voltage to the first current mirror and a second charging voltage to the second current mirror, the first current mirror being configured to provide the first replica undesired component based upon the first charging voltage and the second current mirror being configured to provide the second replica undesired component based upon the second charging voltage.

14. The switching regulator of claim 1, wherein at least one of a group consisting of the switching module, the controller module, the filter module, the noise module, the combination module, and the PWM is implemented as part of a power management unit (PMU) of a cellular phone.

15. The switching regulator of claim 1, wherein at least one of a group consisting of the switching module, the controller module, the filter module, the noise module, the combination module, and the PWM are implemented as part of a single chip or die.

16. The switching regulator of claim 1, wherein at least two of a group consisting of the switching module, the controller module, the filter module, the noise module, the combination module, and the PWM are implemented as part of a common chip or die.

17. A method to regulate an input voltage to provide a regulated output power, comprising:
- (a) switching between the input voltage and a ground in response to a charging control signal to provide a charging current, the charging control signal being proportional to a pulse width modulation (PWM) control signal;
- (b) replicating the charging current to provide a scaled charging current;
- (c) separating the scaled charging current into one or more undesired components;
- (d) scaling the one or more undesired components to provide one or more replica undesired components;
- (e) combining the one or more undesired components and the charging current to provide the regulated output power; and
- (f) comparing the regulated output power with at least one of a group consisting of a reference power and a reference pulse to provide the PWM control signal.

18. The method of claim 17, wherein step (a) comprises:
- (a)(i) switching between the input voltage provided from a battery of a cellular phone and a ground in response to the charging control signal.

19. The method of claim 17, wherein step (a) comprises:
- (a)(i) providing an element charging current when the charging control signal is at a first voltage level; and
- (a)(ii) providing an element discharging current when the charging control signal is at a second voltage level, the charging current being a combination of the element charging current and the element discharging current.

20. The method of claim 17, wherein step (b) comprises:
- (b)(i) sensing a first portion of the charging current to provide a scaled charging current, the scaled charging current being proportional to the first portion of the charging current by a first scaling factor;
- (b)(ii) sensing a second portion of the charging current to provide a first scaled discharging current the first scaled discharging current being proportional to the second portion of the charging current by the first scaling factor; and
- (b)(iii) mirroring the first scaled discharging current to provide a second scaled discharging current, the scaled charging current and the second scaled discharging current being combined to provide the scaled charging current.

21. The method of claim 17, wherein step (c) comprises:
- (c)(i) separating the scaled charging current into one or more undesired components, the one or more undesired components being proportional to an absolute value of an undesired alternating current (AC) component embedded within the charging current.

22. The method of claim 17, wherein step (c) comprises:
- (c)(i) removing a smooth direct current (DC) component embedded within the scaled charging current to provide an undesired alternating current (AC) component;
- (c)(ii) separating the undesired AC component into the one or more one or more undesired components.

23. The method of claim 17, wherein step (c) comprises:
(c)(i) mirroring the scaled charging current to provide a replicated scaled charging current;
(c)(ii) removing a smooth direct current (DC) component embedded within the replicated scaled charging current to provide a first replicated undesired alternating current (AC) component;
(c)(iii) mirroring the first replicated undesired AC component to provide a first undesired component from among the one or more undesired components;
(c)(iv) combining the scaled charging current and a second smooth DC component embedded within the scaled charging current to provide a second replicated undesired AC component; and
(c)(v) mirroring the second replicated undesired AC component to provide a second undesired component from among the one or more undesired components.

24. The method of claim 17, wherein step (d) comprises:
(d)(i) scaling a first undesired component from among the one or more one or more undesired components to provide a first replica undesired component from among the one or more replica undesired components; and
(d)(ii) scaling a second undesired component from among the one or more one or more undesired components to provide a second replica undesired component from among the one or more replica undesired components.

\* \* \* \* \*

UNITED STATES PATENT AND TRADEMARK OFFICE
CERTIFICATE OF CORRECTION

| | |
|---|---|
| PATENT NO. | : 8,129,953 B2 |
| APPLICATION NO. | : 12/461197 |
| DATED | : March 6, 2012 |
| INVENTOR(S) | : Rosario Pagano |

It is certified that error appears in the above-identified patent and that said Letters Patent is hereby corrected as shown below:

IN THE CLAIMS:

At column 23, claim 11, line 32, please replace "one or more one or more" with --one or more--.

At column 26, claim 24, line 6, please replace "one or more one or more" with --one or more--.

At column 26, claim 24, line 10, please replace "one or more one or more" with --one or more--.

Signed and Sealed this
Twenty-fourth Day of April, 2012

David J. Kappos
*Director of the United States Patent and Trademark Office*